United States Patent
Boord et al.

(10) Patent No.: US 6,647,209 B1
(45) Date of Patent: *Nov. 11, 2003

(54) MULTIPLEXER AND DEMULTIPLEXER FOR SINGLE MODE OPTICAL FIBER COMMUNICATION LINKS

(75) Inventors: Warren Timothy Boord, Brooklyn Park, MN (US); Anil K. Jain, North Oaks, MN (US)

(73) Assignee: APA Optics, Inc., Blaine, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/361,048

(22) Filed: Jul. 26, 1999

Related U.S. Application Data

(63) Continuation-in-part of application No. 09/191,575, filed on Nov. 13, 1998, which is a continuation-in-part of application No. 09/023,258, filed on Feb. 13, 1998.

(51) Int. Cl.$^7$ ................................................ H04J 14/02
(52) U.S. Cl. ........................................ 398/84; 398/87
(58) Field of Search ................................ 359/122, 127, 359/129, 130, 133; 398/65, 82, 86, 87, 91

(56) References Cited

U.S. PATENT DOCUMENTS

| | | | |
|---|---|---|---|
| 4,566,761 A | 1/1986 | Carlsen et al. | 350/401 |
| 4,723,829 A | 2/1988 | Koonen | 385/37 |

(List continued on next page.)

FOREIGN PATENT DOCUMENTS

| | | |
|---|---|---|
| DE | 31 49 615 A1 | 7/1983 |
| EP | 0031 027 | 7/1981 |

(List continued on next page.)

OTHER PUBLICATIONS

EEE Photonics Technology Letters, vol. 5, No. 0, Sep. 1993

(List continued on next page.)

*Primary Examiner*—Leslie Pascal
*Assistant Examiner*—Dalzid Singh
(74) *Attorney, Agent, or Firm*—Merchant & Gould P.C.

(57) ABSTRACT

An optical multiplexer and demultiplexer for dense wavelength division multiplexed ("DWDM") fiber optic communication systems is disclosed. As a multiplexer, the device functions to spatially combine the optical signals from several laser sources (each of which is a different wavelength) and launch the spatially combined laser beams into a single optical fiber. As a demultiplexer, the device functions to spatially separate the different wavelengths of a wavelength division multiplexed optical link and launch each of the different wavelengths into a different optical fiber. In either embodiment, the device includes both bulk optic and integrated optic components. The spatial separation or spatial combination of laser beams of different wavelength is achieved with the use of bulk diffraction gratings. Also, bulk optical components are used to collimate and shape (or steer) the free space propagating laser beams to enable efficient coupling of light into single mode optical fibers, or integrated optic waveguides, and to reduce optical cross talk. Polarizing beamsplitters orient the polarization direction of the light to enable maximum diffraction efficiency by the gratings and to reduce the polarization dependent loss. Further, the end faces of optical fibers and integrated optic waveguides are angle polished to reduce back reflection and thereby reduce noise caused by feedback to the laser source. Preferably, the diffraction grating and focusing optics are specified to permit multiplexing and demultiplexing of laser wavelengths separated by 0.4 nanometers (nm) in the 1550 nm wavelength band. The preferred field of view of the optics permit multiplexing and demultiplexing of up to 32–48 wavelength channels separated by 0.4 nanometers in the 1550 nm wavelength band. Although examples of performance are provided for the 1550 nm optical wavelength band, the device components can be designed for use at other wavelength bands, e.g., the optical fiber low absorption loss band at $\lambda\sim1310$ nm.

17 Claims, 17 Drawing Sheets

U.S. PATENT DOCUMENTS

| | | | |
|---|---|---|---|
| 4,741,588 A | 5/1988 | Nicia et al. | 385/37 |
| 4,973,169 A | 11/1990 | Slonecker | 385/1 |
| 5,005,935 A | 4/1991 | Kunikane et al. | 385/24 |
| 5,026,131 A | 6/1991 | Jannson et al. | 350/3.7 |
| 5,224,183 A | 6/1993 | Dugan | 385/24 |
| 5,228,103 A | 7/1993 | Chen et al. | 385/14 |
| 5,278,687 A | 1/1994 | Jannson et al. | 359/125 |
| 5,282,260 A | 1/1994 | Buchal et al. | 385/182 |
| 5,355,237 A | 10/1994 | Lang et al. | 385/37 |
| 5,450,510 A | 9/1995 | Boord et al. | 385/37 |
| 5,457,573 A | 10/1995 | Iida et al. | 359/569 |
| 5,526,155 A | 6/1996 | Knox et al. | 359/130 |
| 5,608,826 A | 3/1997 | Boord et al. | 385/37 |
| 5,748,350 A * | 5/1998 | Pan et al. | 359/130 |
| 5,748,815 A | 5/1998 | Hamel et al. | 385/37 |
| 5,917,625 A * | 6/1999 | Ogusu et al. | 359/130 |
| 6,016,212 A | 1/2000 | Durant et al. | 359/124 |
| 6,163,393 A * | 12/2000 | Wu et al. | 359/127 |
| 6,166,838 A * | 12/2000 | Liu et al. | 359/128 |
| 6,285,810 B1 * | 9/2001 | Fincato et al. | 385/24 |
| 6,333,799 B1 * | 12/2001 | Bala et al. | 359/128 |

FOREIGN PATENT DOCUMENTS

| | | |
|---|---|---|
| EP | 0 859 249 A1 | 8/1998 |
| EP | 0 911 659 A | 4/1999 |
| EP | 1 001 287 A | 5/2000 |
| JP | 62075406 | 4/1987 |
| WO | WO 91 14 321 | 9/1991 |
| WO | WO 93/21548 | 10/1993 |
| WO | 98 15861 A | 4/1998 |
| WO | 99 41858 A | 8/1999 |

OTHER PUBLICATIONS

New York US., pp. 1098–1100, XP 000414187 KC Reichmann et al. '2.5 Gb/s Transmission Over 674 km at Multiple Wavelengths Using a Tunable DBR Laser with an Integrated Electroabsorption Modulator' see p. 1098, left column, paragraph 1.

Kanabar, Y. et al., "High Density Wave Length Division Multiplexing for Multiple Access Networks", (Mar. 1991).

Lin, J. P. et al., "Four–Channel Ti:LiNbO$_3$ Wavelength Division Multiplexer for 1.3—$\mu$m Wavelength Operation", *Optics Letters*, vol. 16, No. 7, pp. 473–475 (Apr. 1, 1991).

Patent Abstracts of Japan, vol.. 014 No. 036 (E–877), Jan. 23, 1990 & JP,A,01 270284 (Hitachi Ltd)Oct. 27, 1989 see abstract.

Prat, David J., "High Performance 4–Wavelength Laser Transmitter", *SPIE* vol. 1788 Sources and Detectors for Fiber Communications, pp. 152–158 (1992).

Wagner, S. S. et al., "Broadband High–Density WDM Transmission Using Superluminescent Diodes", *Electronics Letters*, vol. 26, No. 11, pp. 696–697 (May 24, 1990).

Wagner, S. S. et al., "Experimental Demonstration of a Passive Optical Subscriber Loop Architecture", *Electronics Letters*, vol. 24, No. 6, pp. 344–346 (Mar. 17, 1988).

Wisely, D. R., "32 Channel WDM Multiplexer with 1nm Channel Spacing and 0.7nm Bandwidth", *Electronics Letters*, vol. 27, No. 6, pp. 520–521 (Mar. 14, 1991).

* cited by examiner

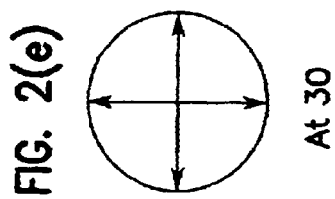
FIG. 2(a) At 22
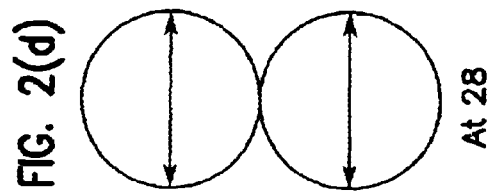
FIG. 2(b) At 24
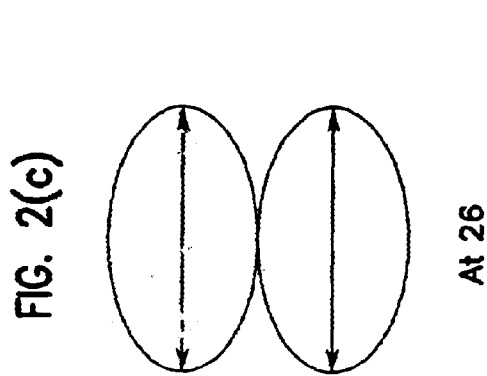
FIG. 2(c) At 26
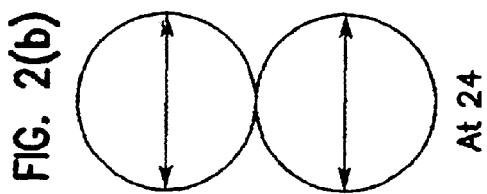
FIG. 2(d) At 28
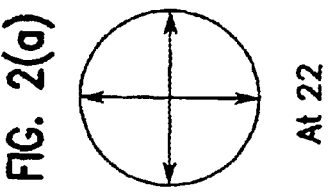
FIG. 2(e) At 30
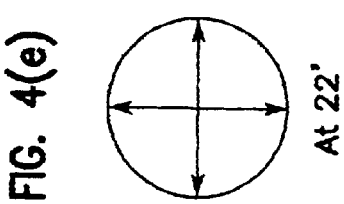
FIG. 4(a) At 30'
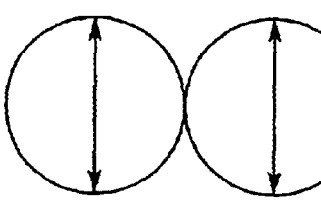
FIG. 4(b) At 28'
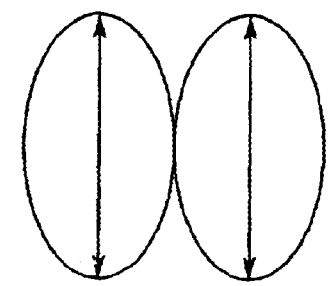
FIG. 4(c) At 26'
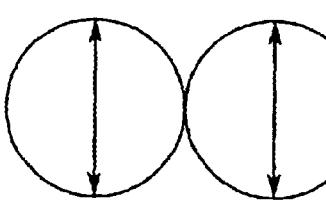
FIG. 4(d) At 24'
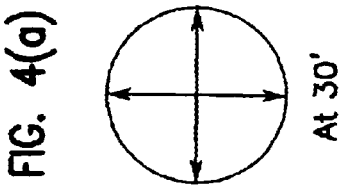
FIG. 4(e) At 22'

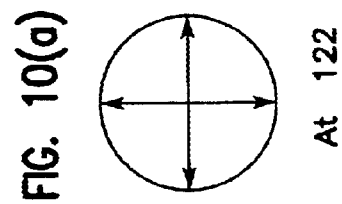
FIG. 10(a) At 122
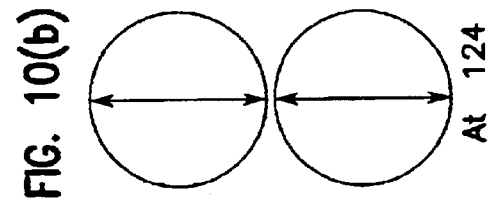
FIG. 10(b) At 124
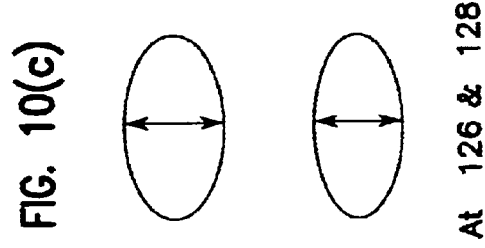
FIG. 10(c) At 126 & 128
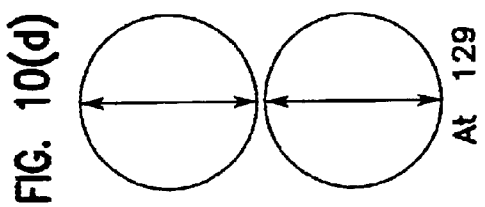
FIG. 10(d) At 129
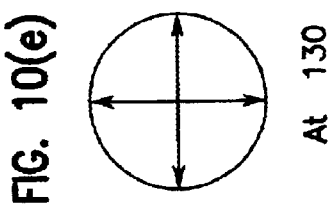
FIG. 10(e) At 130
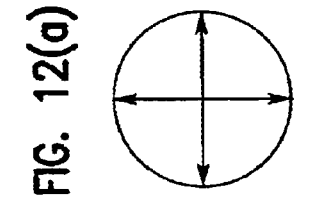
FIG. 12(a) At 130'
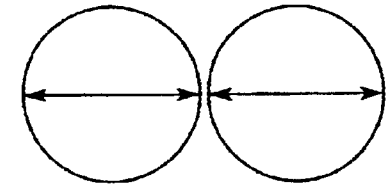
FIG. 12(b) At 129'
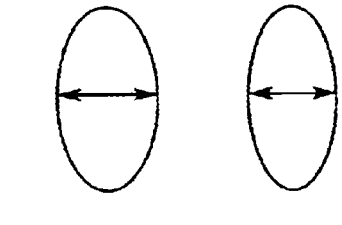
FIG. 12(c) At 128' & 126'
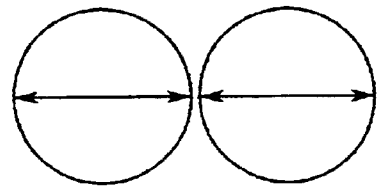
FIG. 12(d) At 124'
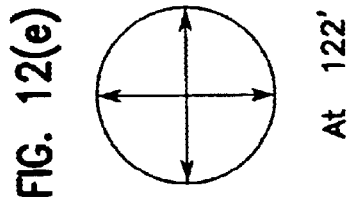
FIG. 12(e) At 122'

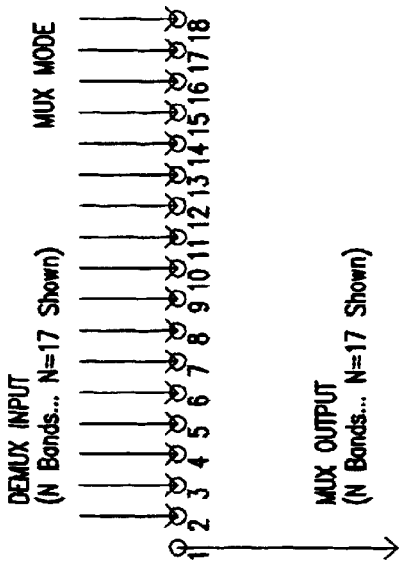
FIG. 17(a)
FIG. 17(b)
FIG. 17(c)
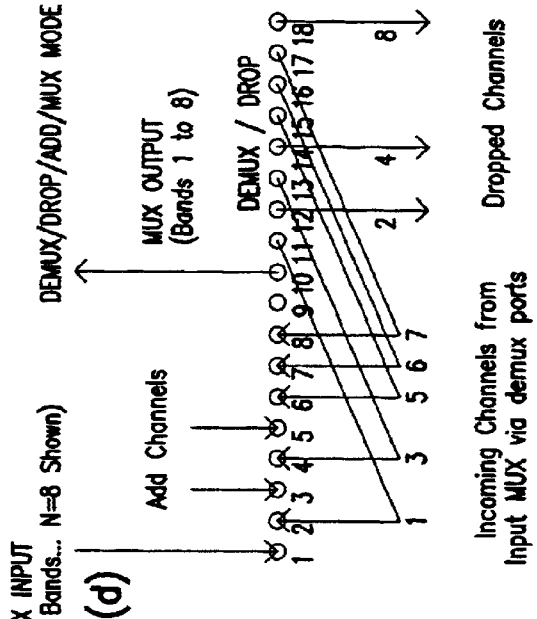
FIG. 17(d)
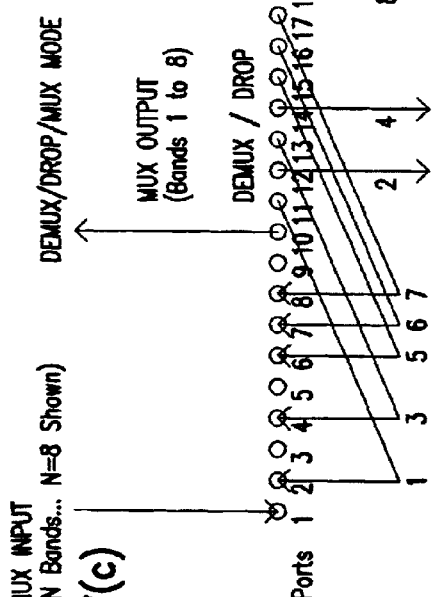
Proposed MUX/DEMUX/ADD/DROP using the same device

MULTIPLEXER AND DEMULTIPLEXER FOR SINGLE MODE OPTICAL FIBER COMMUNICATION LINKS

RELATED APPLICATIONS

This application is a continuation-in-part of application Ser. No. 09/191,575, filed Nov. 13, 1998, titled "MULTIPLEXER AND DEMULTIPLEXER FOR SINGLE MODE OPTICAL FIBER COMMUNICATION LINKS" which is a continuation-in-part of Ser. No. 09/023,258, filed Feb. 13, 1998, titled "MULTIPLEXER AND DEMULTIPLEXER FOR SINGLE MODE OPTICAL FIBER COMMUNICATION LINKS".

FIELD OF THE INVENTION

This invention relates generally to an optic device, more particularly to an optical multiplexer and demultiplexer for dense wavelength division multiplexed ("DWDM") fiber optic communication systems, and more particularly still to a method and apparatus for adding and dropping signals at intermediate nodes along a network line in a DWDM system.

BACKGROUND

The impact of advances in photonics technology in the area of communication systems has been dramatic. By way of example, new communication system architectures have been proposed based on such photonics technology. These communication architectures take advantage of the ability of optical fibers to carry very large amounts of information—with very little marginal cost once the optical fiber is in place.

Photonics communication system architectures based on optical wavelength division multiplexing (WDM) or optical frequency division multiplexing (coherent techniques) to increase the information carrying potential of the optical fiber systems are being developed. For WDM systems, a plurality of lasers are used with each laser emitting a different wavelength. In these types of systems, devices for multiplexing and demultiplexing the optical signals into or out of a single optical fiber are required. Early WDM systems used a wide wavelength spacing between channels. For example, the bandwidth of a $\lambda$=1310 nm link was increased by adding a 1550 nm channel. Fiber optic directional coupler technology was used to multiplex such widely spaced wavelength channels. Since optical fiber system performance is best when optimized for use at a single wavelength window, optimum WDM systems use several closely spaced wavelengths within a particular wavelength window. Currently, the telecommunications industry is working towards the deployment of dense wavelength division multiplexed (DWDM) systems with up to 32 channels in the 1530 to 1565 nm wavelength window—with adjacent channels separated in wavelength by 8 angstroms (100 GHz optical frequency spacing). Future developments envision channel wavelength separations of 4 angstroms (50 GHz optical frequency spacing).

Several technologies are being developed to provide for DWDM. These include micro-optical devices, integrated optic devices, and fiber optic devices. Micro-optical devices use optical interference filters and diffraction gratings to combine and separate different wavelengths. Integrated optic devices utilize optical waveguides of different lengths to introduce phase differences so that optical interference effects can be used to spatially separate different wavelengths. Fiber optic devices utilize Bragg gratings fabricated within the light guiding regions of the fiber to reflect narrow wavelength bands.

Micro-optical devices utilizing diffraction devices have been proposed in the literature (See, e.g., W. J. Tomlinson, Applied Optics, vol. 16, no. 8, pp. 2180–2194, 1977; J. P. Laude, *Technical Digest of the Third Integrated Optics and Optical Fiber Communication Conference*, San Francisco, 1981, pp. 66–67; R. Watanabe et. al., Electronics Letters, vol.16, no. 3, pp. 106–107, 1980; Y. Fujii et. al., Applied Optics, vol. 22, no. 7, pp. 974–978, 1983). These references describe generally how diffraction gratings can be used for WDM. However, to meet the needs of DWDM fiber optic communication systems, high performance is required with respect to parameters such as polarization dependent loss, cross talk, return loss, and insertion loss. In order to meet the specifications for these DWDM performance parameters, the incorporation of additional optical elements to effectively use the wavelength multiplexing and demultiplexing capabilities possible with diffraction gratings is required.

Initial development of wavelength division multiplexed fiber systems were primarily point to point systems. However, there is increasing interest in being able to add and drop signals at intermediate nodes along the network main line. Also of interest is the ability to adjust the network configuration to satisfy changing traffic demands and service requirements.

Therefore, there arises a need for a high performance optical apparatus and method for use in a DWDM system. The present invention directly addresses and overcomes the shortcomings of the prior art by providing DWDM with low polarization dependent loss (<0.5 dB), low insertion loss with single mode fiber optic systems (<5 dB), low cross talk between wavelength channels (<35 dB for 100 GHz channel separation and <30 dB for 50 GHz channel separation), and low return loss (<55 dB). There is also provided the ability to accomplish network reconfiguration by switching any channel between add/drop and passthrough status.

SUMMARY

The present invention provides for an optical multiplexer and demultiplexer for dense wavelength division multiplexed ("DWDM") fiber optic communication systems. In one preferred embodiment of the present invention, a device may be constructed in accordance with the principles of the present invention as a multiplexer. This device functions to spatially combine the optical signals from several laser sources (each of which is a different wavelength) and launch the spatially combined laser beams into a single optical fiber. In a second preferred embodiment of the present invention, a device may be constructed in accordance with the principles of the present invention as a demultiplexer. Here the device functions to spatially separate the different wavelengths of a wavelength division multiplexed optical link and launch each of the different wavelengths into a different optical fiber.

In the preferred embodiments described herein, the device includes both bulk optic and integrated optic components. The spatial separation or spatial combination of laser beams of different wavelength is achieved with the use of bulk diffraction gratings. Also, bulk optical components are used to collimate and shape (or steer) the free space propagating laser beams to enable efficient coupling of light into single mode optical fibers, or integrated optic waveguides, and to reduce optical cross talk. Polarizing beamsplitters orient the polarization direction of the light to enable maximum diffraction efficiency by the gratings and to reduce the polarization dependent loss.

Another feature of the present invention is that the end faces of optical fibers and integrated optic waveguides are angle polished to reduce back reflection and thereby reduce a noise caused by feedback to the laser source. Preferably, the diffraction grating and focusing optics are specified to permit multiplexing and demultiplexing of laser wavelengths separated by 0.4 nanometers (nm) in the 1550 nm wavelength band. The preferred field of view of the optics permit multiplexing and demultiplexing of up to 32–48 wavelength channels separated by 0.4 nanometers in the 1550 nm wavelength band. Although examples of performance are provided for the 1550 nm optical wavelength band, the device components can be designed for use at other wavelength bands, e.g., the optical fiber low absorption loss band at $\lambda\sim1310$ nm.

Therefore, according to one aspect of the invention, there is provided a bidirectional optical apparatus, of the type which is used in connection with optical signals generated by a plurality of laser sources and which is carried by optical fibers, the apparatus comprising: an optical fiber; multiplexer means for spatially combining the optical signals from several laser sources, each of which is a different wavelength, and launching the spatially combined optical signals into a single optical fiber to form a wavelength division multiplexed optical signal; and demultiplexer means for spatially separating the different wavelengths from a single optical fiber carrying a wavelength division multiplexed optical signal and launching each of the different wavelengths into a separate optical fiber.

According to another aspect of the invention, there is provided a bi-directional optical apparatus, comprising: means for collimating the plurality of optical signals of different wavelength; means for splitting the plurality of optical wavelength signals into two parallel propagating beams which are polarized perpendicular to each other; means for rotating the polarization direction of one of the beams by 90° so that both beams at each wavelength are polarized in the same direction; means for expanding the diameter of the collimated beams in the direction parallel to the polarization direction; means for diffracting each of the different wavelengths into a different angular direction relative to a defined direction; means for reducing the expanded diameter of the collimated beams in the direction parallel to the polarization direction; means for recombining the two beams for each wavelength into a single beam for each wavelength, and wherein the recombined beams have two mutually perpendicular polarization components and each recombined beam is propagating in a different angular direction relative to an optic axis; means for focusing each beam of different wavelength to a different spatial location along a line in the focal plane of the focusing means; and means for receiving the focused optical signals at each wavelength and launching the individual signals into separate optical fibers.

According to another aspect of the invention, there is provided a bi-directional optical apparatus, comprising: means for collimating the plurality of optical signals of different wavelength; means for splitting the plurality of optical wavelength signals into two parallel propagating beams:which are polarized perpendicular to each other; means for rotating the polarization direction of one of the beams by 90° so that both beams at each wavelength are polarized in the same direction; means for steering the propagation direction of the collimated beams; means for diffracting each of the different wavelengths into a different angular direction relative to a defined direction; means for recombining the two beams for each wavelength into a single beam for each wavelength, and wherein the recombined beams have two mutually perpendicular polarization components and each recombined beam is propagating in a different angular direction relative to an optic axis; means for focusing each beam of different wavelength to a different spatial location along a line in the focal plane of the focusing means; and means for receiving the focused optical signals at each wavelength and launching the individual signals into separate optical fibers.

One of the features of the present invention, is that it comprises a bi-directional device which can be used as both a multiplexer to spatially combine the optical signals from several laser sources, each of which is a different wavelength, and launch the spatially combined laser beams into a single optical fiber and as a demultiplexer to spatially separate the different wavelengths of a wavelength division multiplexed optical link and launch each of the different wavelengths into a different optical fiber. In either mode of operation, the device meets the DWDM requirements for low polarization dependent loss, low insertion loss with single mode fiber optic systems, low cross talk between wavelength channels, and low return loss.

Another feature of the present invention is its use in an environment where adding and/or dropping signals at intermediate nodes along a line is required and/or desired. In a preferred embodiment constructed according to the principles of the invention, the device uses a demultiplexer. The demultiplexed signals are provided to a first switching array (e.g., an array of 1×2 optical switches) to route any selected set of wavelengths to drop ports for local processing. Pass through wavelengths are routed to a second switching array which further routes the signals to a multiplexer at the output port. The second switching array may also provide add signals by connecting local incoming signals at the dropped wavelengths to the multiplexer at the output port.

While the invention will be described with respect to a preferred embodiment configuration and with respect to particular devices used therein, it will be understood that the invention is not to be construed as limited in any manner by either such configuration or components described herein. Also, while the particular types of lasers and optical components used in the preferred embodiment are described herein, it will be understood that such particular components are not to be construed in a limiting manner. Instead, the functionality of those devices should be appreciated. Further, while the preferred embodiment of the invention will be described in relation to transmitting and receiving information over an optical fiber, it will be understood that the scope of the invention is not to be so limited. The principles of the invention apply to the use of multiplexing and launching a plurality of different wavelength optical signals into a single transmission device and demultiplexing a plurality of different wavelength optical signals and launching the plurality of signals into separate transmission devices. These and other variations of the invention will become apparent to those skilled in the art upon a more detailed description of the invention.

The advantages and features which characterize the invention are pointed out with particularity in the claims annexed hereto and forming a part hereof. For a better understanding of the invention, however, reference should be had to the drawing which forms a part hereof and to the accompanying descriptive matter, in which there is illustrated and described a preferred embodiment of the invention.

BRIEF DESCRIPTION OF THE DRAWING

Referring to the drawing, wherein like numerals represent like parts throughout the several views:

FIGS. 2a–2e are diagrammatic figures illustrating the changes in beam diameter and the polarization state of the various wavelength optical signals as they progress through the apparatus 15 of FIG. 1.

FIGS. 4a–4e are diagrammatic figures illustrating the changes in beam diameter and the polarization state of the various wavelength optical signals as they progress through the apparatus 16 of FIG. 3.

FIGS. 10a–10e are diagrammatic figures illustrating the changes in beam diameter and the polarization state of the various wavelength optical signals as they progress through the apparatus 115 of FIG. 9.

FIGS. 12a–12e are diagrammatic figures illustrating the changes in beam diameter and the polarization state of the various wavelength optical signals as they progress through the apparatus 116 of FIG. 11.

FIGS. 17a–17d schematically illustrates exemplary manners in which a 16-channel DWDM device can be used as an 8-channel OADM.

DETAILED DESCRIPTION

A device constructed in accordance with the principles of the present invention can preferably be used for either multiplexing or demultiplexing several closely spaced optical wavelengths. Therefore, the device operation and components will be described in detail for operation as a demultiplexer. The reverse operating mode, i.e., as a multiplexer, will be described more briefly below since those of skill in the art will appreciate that essentially only the direction of propagation of the light is changed.

Figure 1:
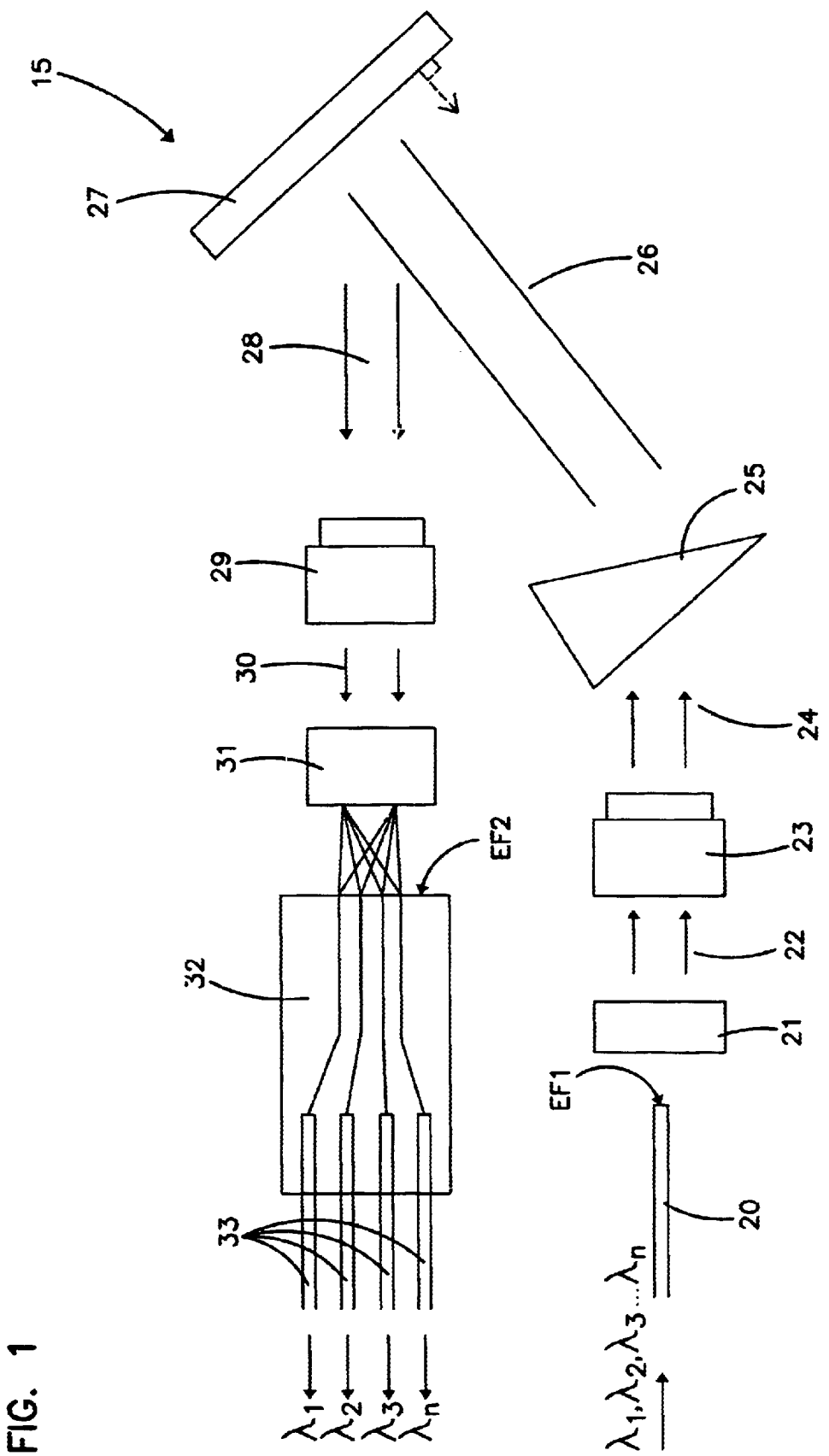
FIG. 1 is a functional block diagram of a demultiplexer constructed in accordance with the principles of the present invention.

Turning now to FIG. 1, there is illustrated in functional form the components and operation of an optical demultiplexer device constructed in accordance with the principles of the present invention. The demultiplexer device is shown generally by the designation 15. Several wavelengths (e.g., $\lambda_1, \lambda_2, \lambda_3$, through $\lambda_n$) are transmitted to the device 15 by a single optical fiber 20. The light exiting the optical fiber 20 is collected and collimated by collimating lens assembly 21. Light at each of the wavelengths exits the collimating lens assembly 21 as a collimated beam. It will be appreciated that the differing wavelengths exit the collimating lens assembly 21 as an equal number of collimated beams (i.e., there are a number of wavelength components of the beam equal to wavelengths $\lambda_n$) which propagate along parallel directions, along the same path, and are incident on beamsplitter component 23.

Preferably the specifications for the collimating lens assembly 21 are that the numerical aperture (NA) of the lens assembly (21 and 21') match that of the guided beam in the optical fiber 20 to minimize input and output coupling losses with the optical fiber. Also, the aperture of the lens assembly is preferably approximately twice the $1/e^2$ beam diameter of the free space propagating collimated beams to reduce diffraction effects which can increase both insertion loss and polarization dependent loss.

Beamsplitter 23 splits the collimated beam into two collimated beams and also includes a half wave plate for rotating the polarization of one of the two beams (as defined by the beamsplitting interface) so that the polarization of both collimated beams is perpendicular to the grooves on the diffraction grating element 27. By incorporating beamsplitter 23, greater than 98% of the light exiting the optical fiber 20 is conditioned to have the proper polarization direction at the diffraction grating 27 so to achieve optimum diffraction efficiency, independent of the polarization state of the light exiting the optical fiber 20. The polarization of the collimated beams at designation 22 is best seen in FIG. 2a and at designation 24 is best seen in FIG. 2b.

Figure 6:
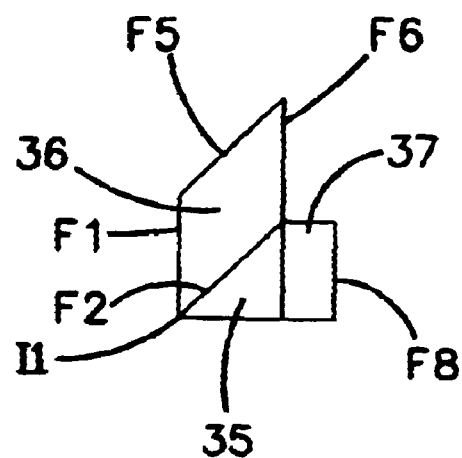
FIG. 6 illustrates the polarizing beamsplitter 23, 29, 23', and 29' in FIGS. 1 and 3 (and the polarizing beamsplitter 123 and 123' of FIGS. 9 and 11).

Now referring to FIG. 6, the preferred specifications for the beamsplitter with half wave plate 23 are next described. Three components, a right angle prism 35, a beam displacement prism 36, and a half wave plate 37 are cemented together to form a monolithic structure 23. The face F2 of prism 36 (which forms an interface I1 with prism 35) is coated with a multilayer dielectric polarizing beamsplitter coating. Component faces F1, F6, and F8 are antireflective coated. Light incident on interface I1 is split into two components, one polarized perpendicular to the plane of incidence (i.e., s component) and one polarized parallel to the plane of incidence (i.e., p component). The s component is reflected to face F5 where it undergoes total internal reflection so as to exit face F6 of prism 36. The p component is transmitted to the half wave plate 37. As the light propagates through the half wave plate, the polarization direction is rotated 90° so that when the light exits face F8 of the half wave plate 37, the polarization direction is parallel to that of the s component which exits face F6 of prism 36.

Figure 3:
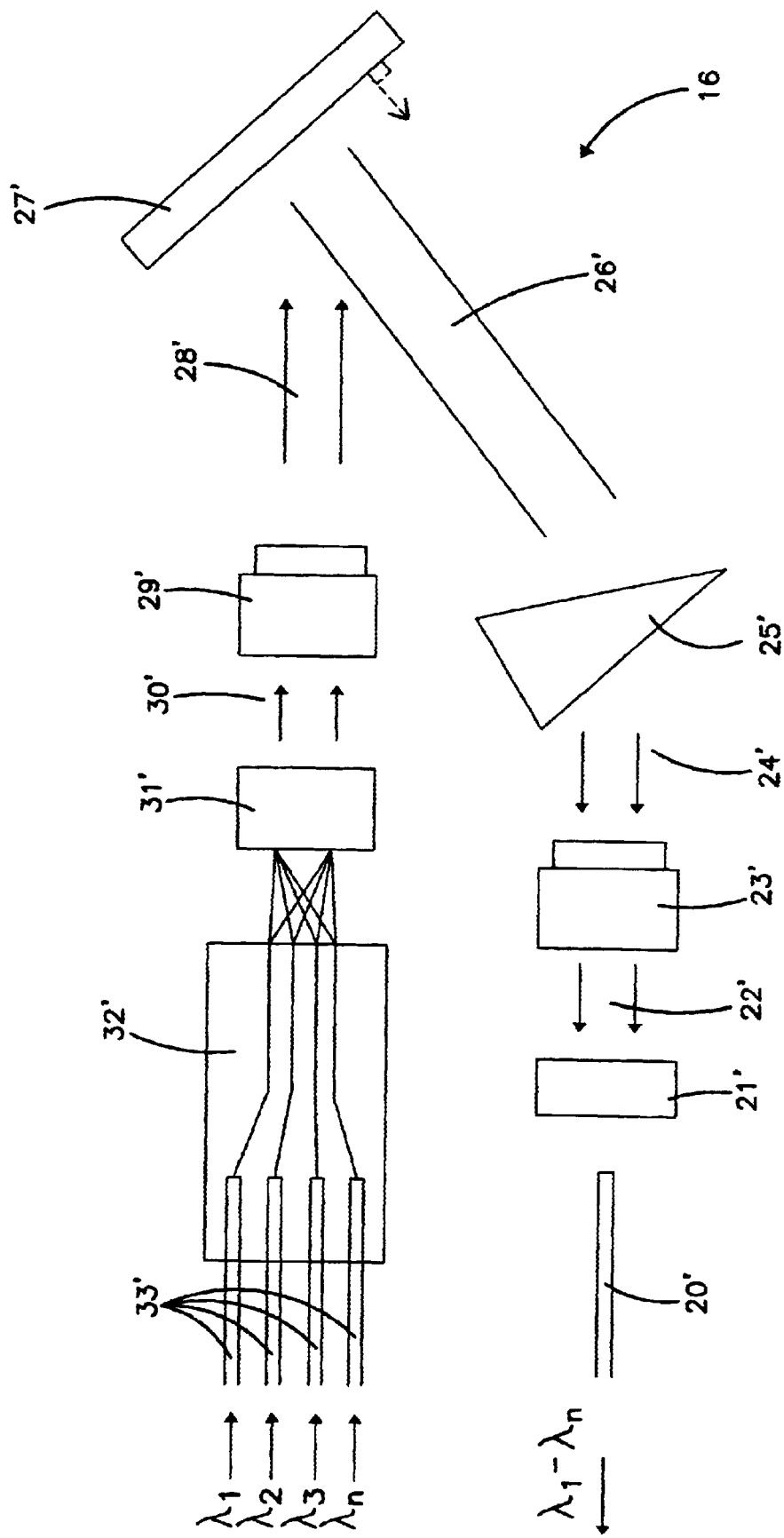
FIG. 3 is a functional block diagram of a multiplexer constructed in accordance with the principles of the present invention.
Figure 8A:
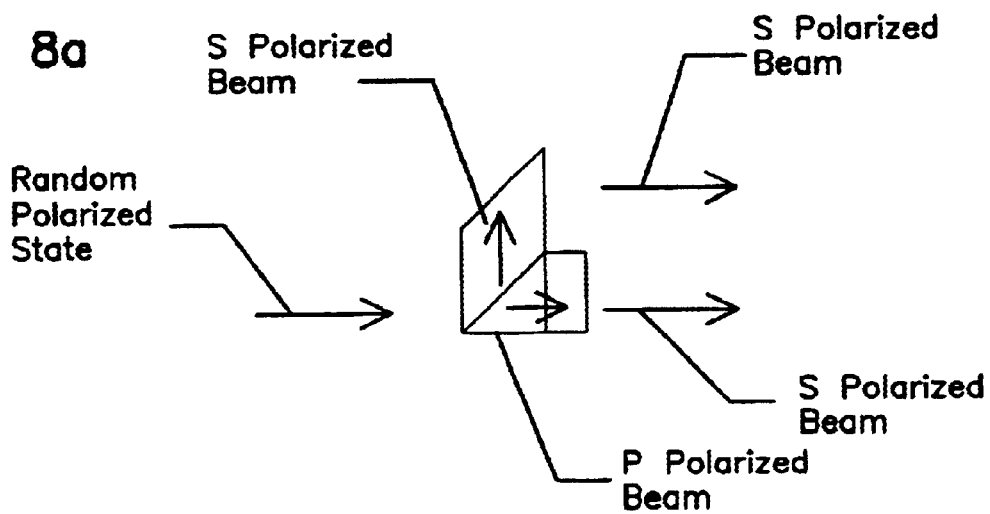
FIGS. 8a and 8b illustrate two possible configurations of the polarizing beamsplitter 23, 29, 23' and 29' of FIGS. 1 and 3 (and devices 123 and 123' of FIGS. 9 and 11).
Figure 8B:
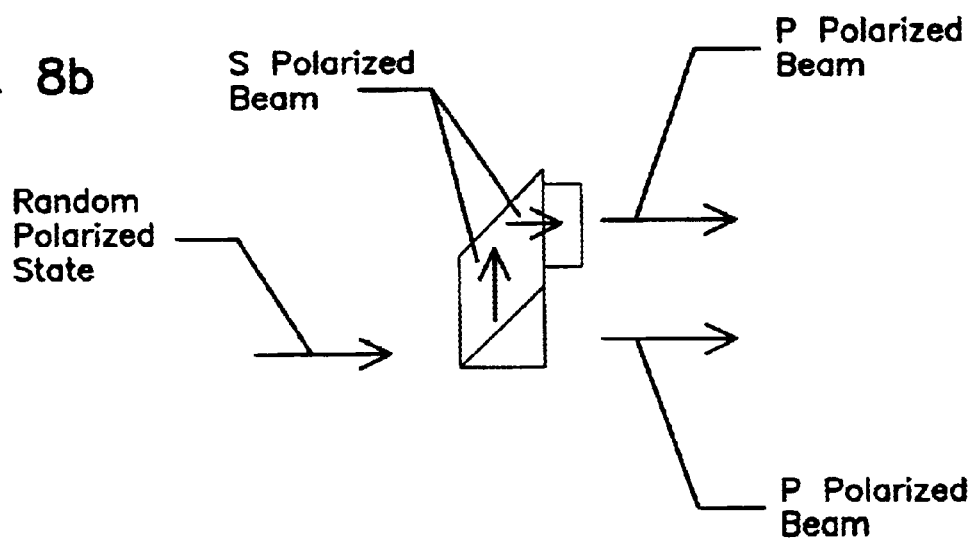

Polarizing beamsplitters 23, 23', 29, and 29' of FIGS. 1 and 3 are shown oriented so that the two beams exiting (or entering) the polarizing beamsplitter propagate parallel to each other in a plane which is perpendicular to the plane of the DWDM device 15. For this configuration, the polarizing beamsplitter is constructed as shown in FIG. 8a. The polarizing beamsplitters could also be rotated 90° so that the two beams exiting (or entering) the polarizing beamsplitter propagate parallel to each other in a plane which is parallel the plane of DWDM device 15. For this configuration, the polarizing beamsplitter is constructed as shown in FIG. 8b. In this case, the p polarized component (as defined by the incident light direction and the interface I1 of FIG. 6) is oriented perpendicular to the diffraction grating grooves.

Now returning to FIG. 1, the split, polarized, and collimated beams then pass through optically transparent prism 25 which expands the diameter of the beams in the direction of polarization, i.e., the direction perpendicular to the diffraction grating 27 grooves. FIG. 2c schematically illustrates the expansion of the diameter of the collimated beam shape along the path from the beam shaping prism 25 to the diffraction grating 27, designated as 26. Beam expansion in one direction is implemented because the beam undergoes an anamorphic demagnification upon diffraction at grating 27. The diffracted beam then has a circular cross section which increases coupling efficiency to the circularly symmetric optical fibers (33 and 20) and integrated optic waveguides 32.

Figure 7:
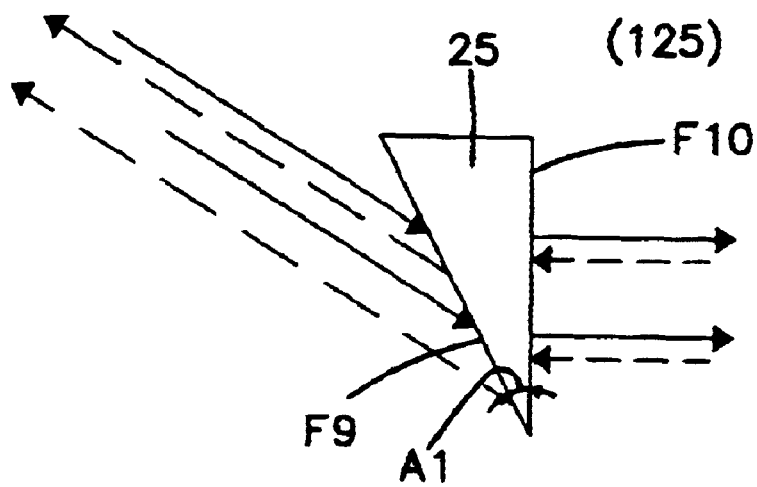
FIG. 7 illustrates the light beams through prism 25 and 25' (and 125 and 125') in more detail.

The preferred prism 25 is described with reference to FIG. 7. The prism is a right angle prism and fabricated using a high index (e.g., n=1.744) glass material. Angle A1 of the right angle prism is in the range of 25° to 30°. The collimated light beam is incident on the hypotenuse (face F9) of the right angle prism at an angle which is approximately equal to the Brewsters angle for the air to glass interface. The incident light which is s polarized relative to the beam splitting interface of the polarizing beamsplitter 23, is p polarized relative to the plane of incidence at the anamorphic beam expanding prism 25. Thus, the reflectance for the p polarized light incident on surface F9 is less than one percent (<1%). Light transmitted through prism 25 is incident on face F10 at near normal incidence. Face F10 is antireflective coated to reduce reflection losses. Refraction of the incident light beam at surface F9 increases the diameter of the beam in the direction of the hypotenuse of the right angle prism 25, and since the light is near normal incidence at face F10, the light exits prism face F10 with an anamorphic magnification of the beam diameter as described in FIGS. 2b and 2c.

At the diffraction grating 27, the collimated beams of each of the different wavelengths ($\lambda_1$, $\lambda_2$, $\lambda_3$ through $\lambda_n$) is diffracted into a different angular direction relative to the grating normal (shown in phantom). Also, the collimated beam of each wavelength undergoes an anamorphic demagnification upon diffraction. That is, the beam diameter in the direction perpendicular to the grating grooves is reduced (as best seen at designation 28 in FIG. 2d). Accordingly, after diffraction, the collimated beam cross section is again nearly circular. The diffraction grating 27 is a holographic grating with ~9000 grooves/cm for the 100 GHz channel spacing, and ~11000 grooves/cm for the 50 GHz channel spacing.

The two collimated beams at each wavelength are then recombined into a single beam by the beamsplitting polarizer and half waveplate component 29. Thus, there is a single beam for each wavelength exiting component 29. The two beams are recombined into a single beam to improve the coupling efficiency to the integrated optic waveguides 32 (and to the optical fiber 20 in the reverse mode operation, i.e. as a multiplexer). Each beam at designation 30 again has two mutually perpendicular polarization components (best seen in FIG. 2e). Also, the collimated beam for each wavelength propagates in a different angular direction relative to the optic axis of the lens assembly component 31. The beamsplitting polarizer and half waveplate component 29 is identical to component 23.

Since the collimated beam for each wavelength is propagating in a different angular direction at designation 30, the lens assembly 31 focuses each wavelength to a different spatial location along a line in the focal plane of the lens assembly 31. In the preferred embodiment, the lens assembly 31 is identical to lens assembly 21.

The integrated optic fan out circuit component 32 has an array of integrated optic waveguides with input coupling ports equally spaced at a distance of several tens of microns. The spacing of the waveguide input ports, along with the focal length of lens assembly 31 and the period of the diffraction grating 27 are specified so that the focused spot of each of the wavelengths aligns to a different waveguide coupling port. Also, the collimated beam diameters and the focal length of lens assembly 31 are specified to match the diameter of the focused spot with the mode diameter of the guided beam in the integrated optic waveguides. This ensures good optical coupling efficiency to the waveguides.

The integrated optic waveguides of component 32 fan out to a larger separation which permits butt coupling of the waveguides to a linear array of single mode optical fibers 33. Thus, each wavelength is coupled to a different optical fiber 33 which can then be used to transmit each wavelength to different local terminals. The end faces of the waveguide coupling ports EF2 and optical fiber end face EF1 are angle polished to reduce back reflected light to <60 dB. It will be appreciated that reducing feed back to the laser sources reduces optical intensity noise on the laser output beam. The waveguide device 32 is a silica-based integrated optical waveguide circuit.

Turning now to FIG. 3, there is illustrated a multiplexer device 16 which includes components similar to the demultiplexer described above in connection with FIG. 1. It will be appreciated that the multiplexer device 16 is used in the reverse direction as a demultiplexer 15 and is used to combine several laser sources of different wavelengths. Accordingly, those components which are similar to components described above in connection with FIG. 1 are designated by the same number designation followed by a prime. It will be appreciated by those of skill in the art that the considerations for selection of the components are generally the same, although both overall and individually the components perform "reverse" functions in the two embodiments.

First, each of the wavelengths ($\lambda_1$, $\lambda_2$, $\lambda_3$ through $\lambda_n$) is coupled into the multiplexer device 16 from a different single mode optical fiber 33'. The wavelengths are launched into a fan-in circuit 32', wherein the light in each fiber is coupled into a different integrated optic waveguide. These waveguides are arranged and configured to guide each of the wavelengths to a different output coupling port. The waveguide output coupling ports are equally spaced at a distance of several tens of microns. At the output coupling ports, each wavelength is launched into a free space propagating beam.

Lens assembly 31' collects the light emitted at the linear array of waveguide output ports and collimates the light. Since each wavelength is launched from a port located at a different location along a line in the focal plane of lens assembly 31', the light at each wavelength propagates in a different angular direction after collimation by lens assembly 31'. A schematic diagram of the light at designation 30' is illustrated in FIG. 4a.

Next, the beamsplitting polarizer and half wave plate assembly 29' splits each of the collimated beams into two beams and rotates the polarization of the p component beam so that the polarization of each of the two beams for each of the wavelengths is perpendicular to the grating grooves of the diffraction grating 27'. A schematic diagram of the polarization state and the beam cross section shape at designation 28' is shown in FIG. 4b.

At the diffraction grating 27', each of the collimated beams (for each of the wavelengths) is diffracted into the same angular direction. That is, the collimated beams for each of the diffracted wavelengths propagates in parallel directions along the same optical path. Upon diffraction by component 27', the collimated beams undergo an anamorphic magnification so that the beam diameter in the direction perpendicular to the grating grooves is increased by approximately a factor of two. The beam cross sectional shape and the polarization direction of the beam at designation 26' is shown schematically in FIG. 4c.

Beam shaping prism 25' then reduces the diameter of the collimated beams in the direction of polarization so that the collimated beams propagating from component 25' to components 23', 21' and 20' have a circular cross sectional shape. This circular cross section shape at designation 24' is illustrated schematically in FIG. 4d.

Polarizing beam splitter 23' recombines the two collimated beams for each of the wavelengths and rotates the polarization of one of the two beams so that the collimated beam exiting component 23' (e.g., at designation 22') has two polarization states, as shown schematically in FIG. 4e. Lens assembly 21' focuses the collimated beams for each wavelength onto the end face of optical fiber 20'. Preferably, beam diameters and lens assembly focal lengths are specified to match the focused spot diameter to the diameter of the guided mode in the optical fiber. This ensures efficient input coupling of the optical beam. The end faces of the waveguide coupling ports 32' and optical fiber end faces 33', and 20' are angle polished to reduce back reflected light to less than sixty dB (<60 dB). It will be appreciated that reducing feed back to the laser sources reduces optical intensity noise on the laser output beam.

Alternative Embodiment

Figure 9:
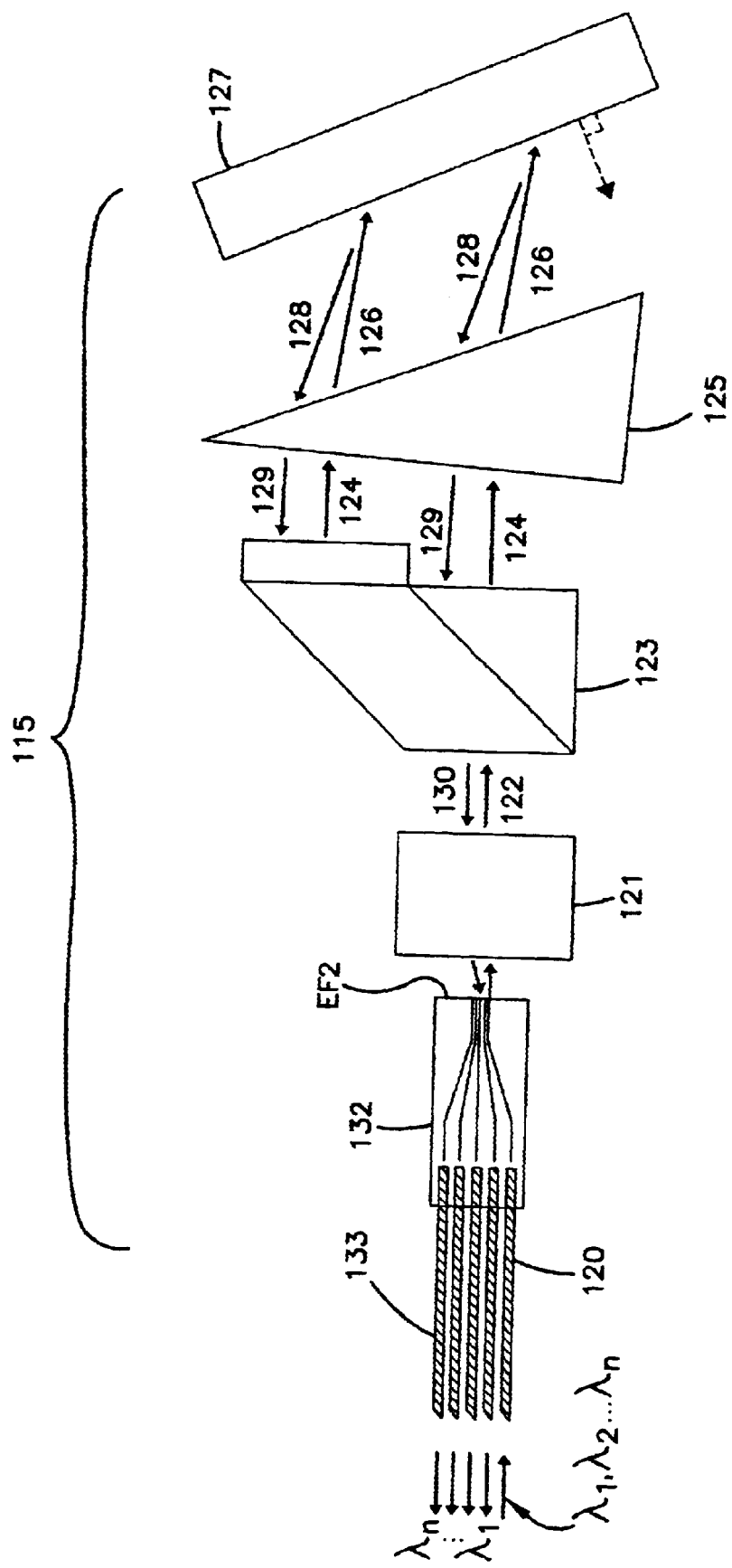
FIG. 9 is a functional block diagram of an alternative embodiment demultiplexer constructed in accordance with the principles of the present invention.

Turning now to FIG. 9, there is illustrated in functional form the components and operation of an alternative optical demultiplexer device constructed in accordance with the principles of the present invention. The demultiplexer device is shown generally by the designation 115. Several wavelengths (e.g., $\lambda_1$, $\lambda_2$, $\lambda_3$, through $\lambda_n$) are transmitted to the device 115 by a single optical fiber 120. The light exiting the optical fiber 120 is collected and collimated by collimating lens assembly 121. Light at each of the wavelengths exits the collimating lens assembly 121 as a collimated beam. It will be appreciated that the differing wavelengths exit the collimating lens assembly '21 as an equal number of collimated beams (i.e., there are-a number of wavelength components of the beam equal to wavelengths $\lambda_n$) which propagate along parallel directions, along the same path, and are incident on beamsplitter component 123.

Preferably the specifications for the collimating lens assembly 121 are that the numerical aperture (NA) of the lens assembly (121 and 121') match that of the guided beam and in the fan out integrated optic circuit waveguides 132 to minimize input and output coupling losses with the optical waveguide. Also, the aperture of the lens assembly is preferably approximately twice the $1/e^2$ beam diameter of the free space propagating collimated beams to reduce diffraction effects which can increase both insertion loss and polarization dependent loss.

Beamsplitter 123 splits the collimated beam into two collimated beams and also includes a half wave plate for rotating the polarization of one of the two beams (as defined by the beamsplitting interface) so that the polarization of both collimated beams is perpendicular to the grooves on the diffraction grating element 127. By incorporating beamsplitter 123, greater than 98% of the light exiting the optical fiber 120 is conditioned to have the proper polarization direction at the diffraction grating 127 so to achieve optimum diffraction efficiency, independent of the polarization state of the light exiting the optical fiber 120. The polarization of the collimated beams at designation 122 is best seen in FIG. 10a and at designation 124 is best seen in FIG. 10b.

The preferred specifications for the beam splitter with half wave plate 123 have been described above in connection with device 23 and FIG. 6.

Figure 11:
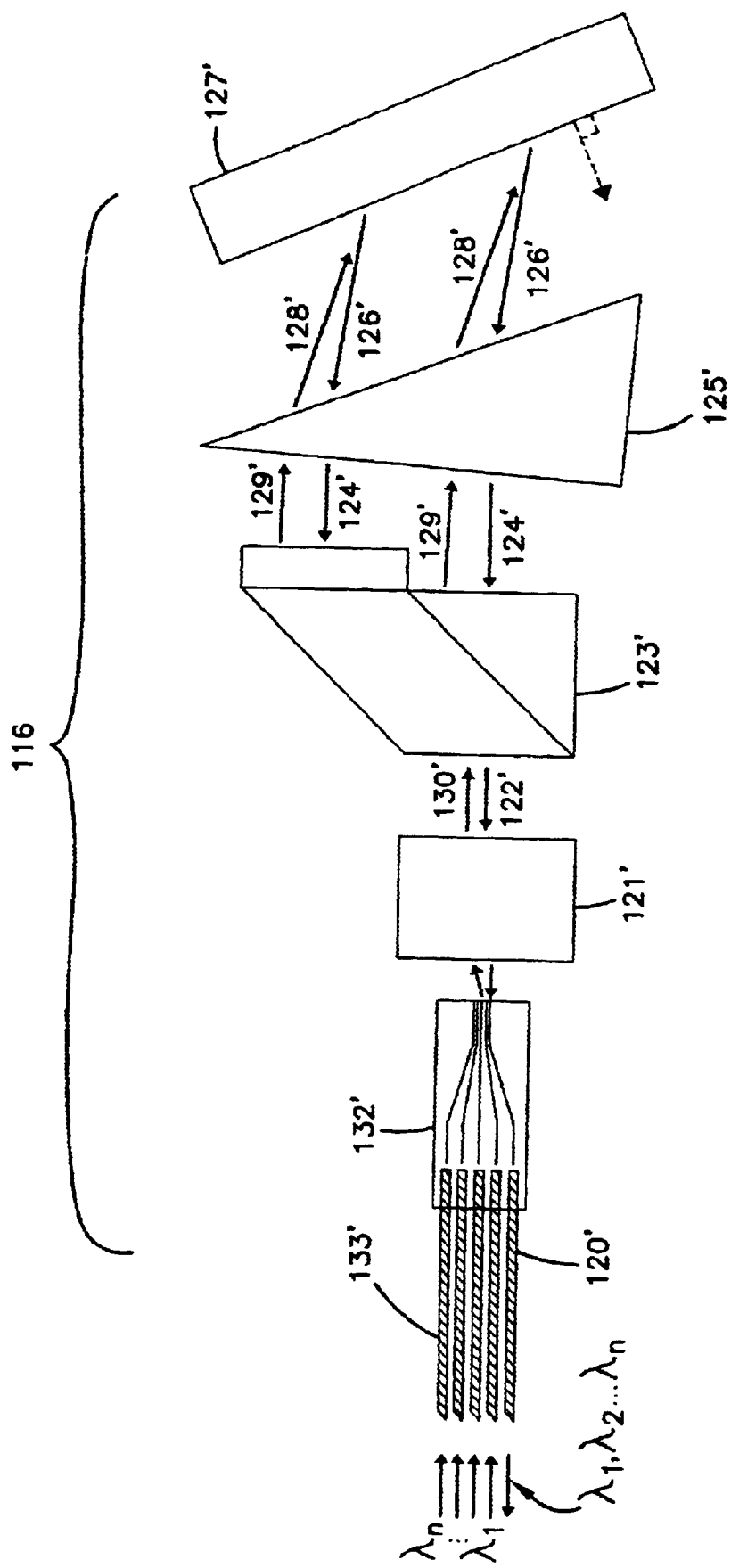
FIG. 11 is a functional block diagram of an alternative embodiment multiplexer constructed in accordance with the principles of the present invention.

Polarizing beamsplitters 123 and 123' of FIGS. 9 and 11 are shown oriented so that the two beams exiting (or entering) the polarizing beamsplitter propagate parallel to each other in a plane which is parallel to the plane of the DWDM device 115. For this configuration, the polarizing beamsplitter is constructed as shown in FIG. 8b. The polarizing beamsplitters could also be rotated 90° so that the two beams exiting (or entering) the polarizing beamsplitter propagate parallel to each other in a plane which is perpendicular to the plane of DWDM device 115. For this configuration, the polarizing beamsplitter is constructed as shown in FIG. 8a. In this case, the s polarized component (as defined by the incident light direction and the interface I1 of FIG. 6) is oriented perpendicular to the diffraction grating grooves.

Now returning to FIG. 9, the split, polarized, and collimated beams then pass through optically transparent prism 125 which decreases the diameter of the beams in the direction of polarization, i.e., the direction perpendicular to the diffraction grating 127 grooves. FIG. 10c schematically illustrates the reduction of the diameter of the collimated beam shape along the path from the beam steering prism 125 to the diffraction grating 127, designated as 126.

The preferred prism 125 is described with reference to FIG. 7. The prism is a right angle prism and fabricated using a high index (e.g., n=1.744) glass material. Angle A1 of the right angle prism is in the range of 25° to 30°. The collimated light beam is incident on a leg (face F10) of the right angle prism. The incident light which is p polarized relative to the beam splitting interface of the polarizing beamsplitter 123, is p polarized relative to the plane of incidence at the beam steering prism 125. Faces F9 and F10 are antireflective coated to reduce reflection losses. Refraction of the incident light beam at surface F9 decreases the diameter of the beam in the direction of the hypotenuse of the right angle prism 125. As prism 125 is rotated about an axis perpendicular to the plane of the drawing of FIG. 7, the angle of incidence at face F10 is changed, resulting in a change in the propagation direction of the beam exiting face F9. The change in the angular direction of the light beam exiting face F9 is less than the change in angle of incidence on face F10. The beam steering prism 125 therefore provides a fine tuning control of the angle of incidence on the diffraction grating 127.

At the diffraction grating 127, the collimated beams of each of the different wavelengths ($\lambda_1$, $\lambda_2$, $\lambda_3$ through $\lambda_n$) are diffracted into a different angular direction relative to the grating normal (shown in phantom). The diffraction grating is used in the Littrow configuration, therefore the angular deviation between the incident beam and the diffracted beams is small. The diffraction grating 127 is a holographic grating with ~11,000 grooves/cm for the 100 GHz and 50 GHz channel spacing, and ~9,000 grooves/cm for the 200 GHz channel spacing.

The two collimated beams 128 at each wavelength are then recombined into a single beam by the beamsplitting polarizer and half waveplate component 123. Thus, there is a single beam 130 for each wavelength exiting component 123. The two beams are recombined into a single beam to improve the coupling efficiency to the integrated optic waveguides 132. Each beam at designation 130 again has two mutually perpendicular polarization components (best seen in FIG. 10e). Also, the collimated beam for each wavelength propagates in a different angular direction relative to the optic axis of the lens assembly component 121.

Since the collimated beam for each wavelength is propagating in a different angular direction at designation 130, the lens assembly 121 focuses each wavelength to a different spatial location along a line in the focal plane of the lens assembly 121.

The integrated optic fan out circuit component 132 has an array of integrated optic waveguides with input/output coupling ports spaced at distances of several tens of microns. The spacing of the waveguide input ports, along with the focal length of lens assembly 121 and the period of the diffraction grating 127 are specified so that the focused spot of each of the wavelengths aligns to a different waveguide coupling port. Also, the collimated beam diameters and the focal length of lens assembly 121 are specified to match the diameter of the focused spot with the mode diameter of the guided beam in the integrated optic waveguides. This ensures good optical coupling efficiency to the waveguides.

The integrated optic waveguides of component 132 fan out to a larger separation which permits butt coupling of the waveguides to a linear array of single mode optical fibers 133 and 120. Thus, each wavelength is coupled to a different optical fiber 133 which can then be used to transmit each wavelength to different local terminals. The end faces of the waveguide coupling ports EF2 are angle polished to reduce back reflected light to <60 dB. It will be appreciated that reducing feed back to the laser sources reduces optical intensity noise on the laser output beam. The waveguide device 132 is an integrated optical waveguide circuit.

Turning now to FIG. 11, there is illustrated an alternative embodiment multiplexer device 116 which includes components similar to the demultiplexer described above in connection with FIG. 9. It will be appreciated that the multiplexer device 116 is used in the reverse direction as a demultiplexer 115 and is used to combine several laser sources of different wavelengths. Accordingly, those components which are similar to components described above in connection with FIG. 9 are designated by the same number designation followed by a prime. It will be appreciated by those of skill in the art that the considerations for selection of the components are generally the same, although both overall and individually the components perform "reverse" functions in the two embodiments.

First, each of the wavelengths ($\lambda_1$, $\lambda_2$, $\lambda_3$ through $\lambda_n$) is coupled into the multiplexer device 116 from a different single mode optical fiber 133'. The wavelengths are launched into a fan-in circuit 132', wherein the light in each fiber is coupled into a different integrated optic waveguide. These waveguides are arranged and configured to guide each of the wavelengths to a different output coupling port. The waveguide output coupling ports are spaced at a distance of several tens of microns. At the output coupling ports, each wavelength is launched into a free space propagating beam.

Lens assembly 121' collects the light emitted at the linear array of waveguide output ports and collimates the light. Since each wavelength is launched from a port located at a different location along a line in the focal plane of lens assembly 121', the light at each wavelength propagates in a different angular direction after collimation by lens assembly 121'. A schematic diagram of the light at designation 130' is illustrated in FIG. 12a.

Next, the beamsplitting polarizer and half wave plate assembly 123' splits each of the collimated beams into two beams and rotates the polarization of the s component beam so that the polarization of each of the two beams for each of the wavelengths is perpendicular to the grating grooves of the diffraction grating 127'. A schematic diagram of the polarization state and the beam cross section shape at designation 129' is shown in FIG. 12b.

Beam steering prism 125' refracts the two beams for each wavelength so that the beams are incident on the diffraction grating at an angle close to that required for the Littrow operating configuration. Large angular rotations of beam steering prism 125' provides fine tuning control of the incident angle at the diffraction grating.

At the diffraction grating 127', each of the collimated beams (for each of the wavelengths) is diffracted into the same angular direction when the incident angles are tuned properly. That is, the collimated beams for each of the diffracted wavelengths propagates in parallel directions along the same optical path. The beam cross sectional shape and the polarization direction of the beam at designation 126' is shown schematically in FIG. 12c.

Polarizing beam splitter 123' recombines the two collimated beams for each of the wavelengths and rotates the polarization of one of the two beams so that the collimated beam exiting component 123' (e.g., at designation 122') has two polarization states, as shown schematically in FIG. 12e. Lens assembly 121' focuses the collimated beams for each wavelength onto the end face of the integrated optic waveguide 132' which is coupled to optical fiber 120'. Preferably, beam diameters and lens assembly focal lengths are specified to match the focused spot diameter to the diameter of the guided mode in the integrated optic waveguide. This ensures efficient input coupling of the optical beam. The end faces of the waveguide coupling ports 132' and optical fiber end faces 133', and 120' are angle polished to reduce back reflected light to less than sixty dB (<60 dB). It will be appreciated that reducing feed back to the laser sources reduces optical intensity noise on the laser output beam.

In Operation

Figure 5:
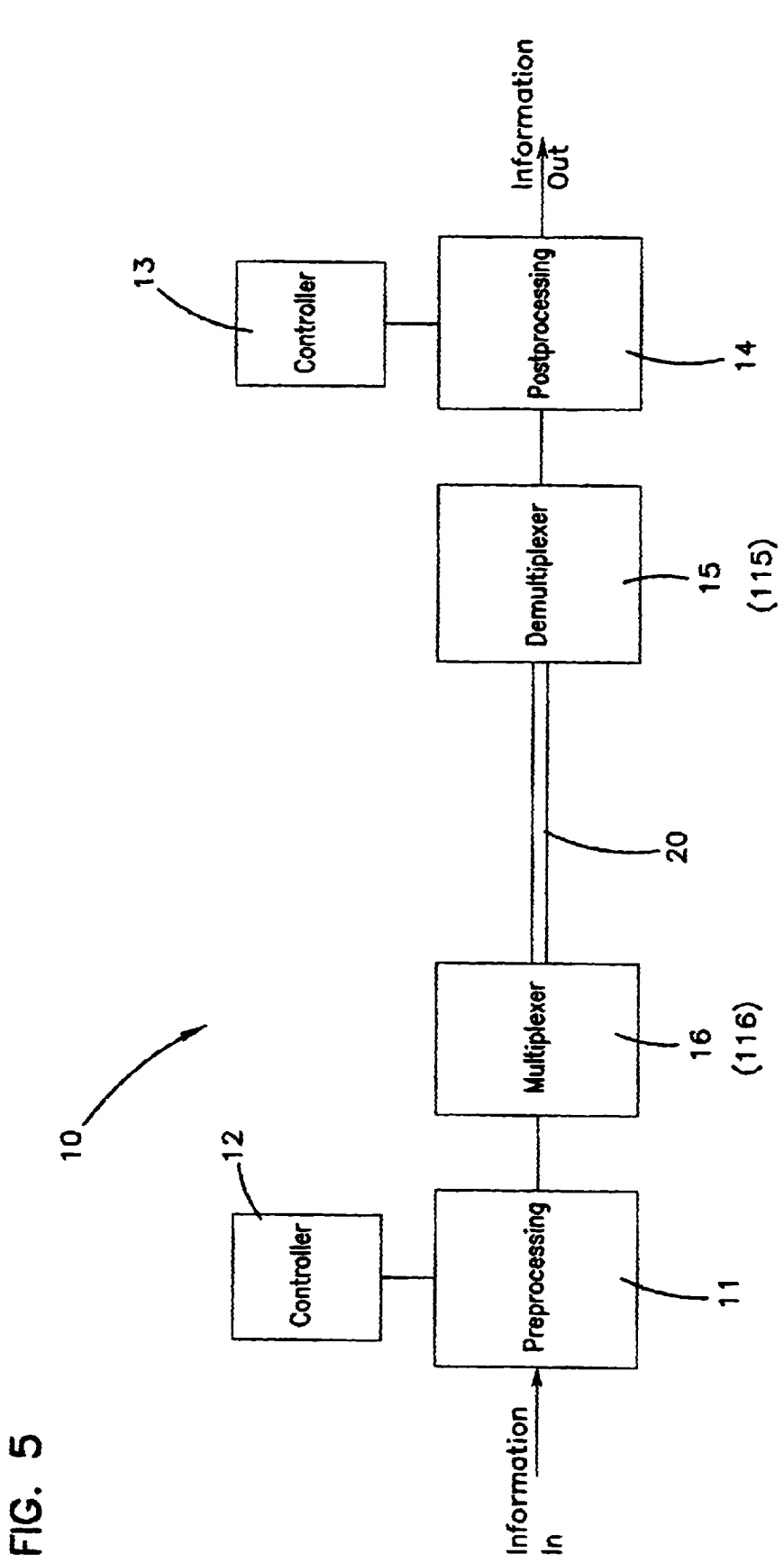
FIG. 5 illustrates an environment in which the principles of the present invention multiplexer 16 and demultiplexer 15 (or alternative embodiment devices 115 and 116) may be employed.

Turning now to FIG. 5, in use, the preferred multiplexer 16 and demultiplexer 15 may be used in a system 10 for transmitting information over optical fiber 20. Devices which provide for multiplexing a plurality of wavelengths, including modulating the wavelengths to encode information therein are described in more detail in U.S. patent application Ser. No. 08/769,459, filed Dec. 18, 1996; U.S. patent application Ser. No. 08/482,642, filed Jun. 7, 1995; and U.S. patent application Ser. No. 08/257,083, filed Jun. 9, 1994. Each of the foregoing applications are owned by the Assignee of the present invention and are hereby incorporated herein and made a part hereof. It will be appreciated that alternative embodiment devices 115 and 116 may be used in a system as generally described in FIG. 5 in lieu of devices 15 and 16 respectively.

Still referring to FIG. 5, encoded information may be provided to multiplexer 16 by preprocessing block 11. Providing control function(s) for block 11 is controller block 12 which may be comprised of a mini-computer, special purpose computer and/or personal computer as will be appreciated by those of skill in the art. The information provided to block 11 may include digitized data, voice, video, etc. However, it will be appreciated that amplitude modulation may be used in connection with multiplexer 16 and demultiplexer 15.

The demultiplexer 15 provides the separated optical signals to post-processing block 14. Providing control function(s) for block 14 is controller block 13 which may be comprised of a mini-computer, special purpose computer and/or personal computer.

In this manner, the multiplexer 16 and demultiplexer 15 help develop a building block on which new telecommunication system architectures can be developed. These new telecommunication system architectures are capable of distributing large amounts of information throughout the network. Wavelength division multiplexing and high speed external modulation of the laser light provide for the generation of the large bundles of information.

Optical Add—Drop Multiplexer (OADM) Embodiment

Figure 13:
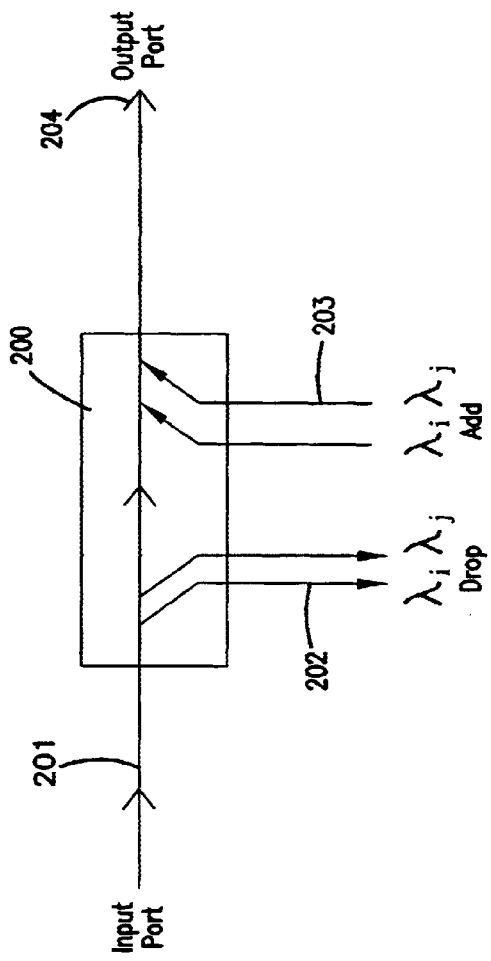
FIG. 13 is a functional block diagram of an optical add—drop multiplexer (OADM) in which the present invention may be employed.

As noted above, initial development of wavelength division multiplexed fiber systems were primarily point to point systems. However, there is increasing interest in being able to add and drop signals at intermediate nodes along the network main line. Also of interest is the ability to adjust the network configuration to satisfy changing traffic demands and service requirements. To accomplish network reconfiguration, the ability to switch any channel between add/drop and passthrough is required. Optical Add-Drop Multiplexers (OADM) can be implemented using the various wavelength division multiplexing technologies. The basic optical configuration of an add/drop network is shown in FIG. 13 at block 200. Here the OADM redirects specified wavelength channels from the input multiwavelength signal 201 to drop ports 202. At the same time, different signals at those dropped wavelengths are routed from the add ports 203 to the output port 204. Signals at all other wavelength channels are routed directly from the input port 201 to the output port 204.

Figure 14:
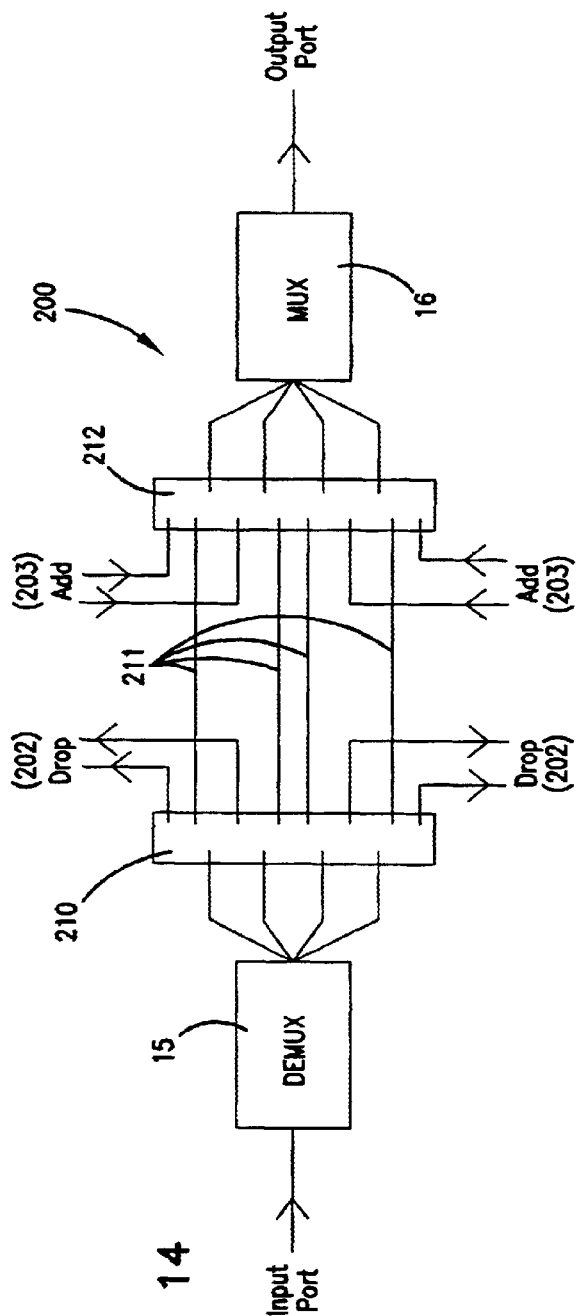
FIG. 14 is functional block diagram of an optical add—drop multiplexer constructed in accordance with the principles of the present invention.

FIG. 14 describes a real time reconfigurable OADM 200 where all the channel wavelengths are first demultiplexed at DEMUX block 15 and directed to switching array block 210. In the preferred embodiment an array of 1×2 optical switches may be used for such switching array. However, it will be appreciated that other devices wherein switching of wavelengths is accomplished might be utilized. The first switching array block 210 selectively routes any selected set of wavelengths to "drop" ports 202 for local processing. Passthrough wavelengths 211 are switched to a second switching array block 212. In the preferred embodiment, second switching array block 212 is also constructed of 1×2 optical switches. Second switching array block routes the signals to a multiplexer 16 at the output port. The second switching array block 212 also connects local incoming signals from the add ports 203, at the dropped wavelengths, to the multiplexer 16 at the output port.

A diffraction grating based dense wavelength division multiplexer (DWDM) as described above can be used in any of the following four modes:

1. demultiplexer
2. multiplexer
3. demultiplexer/drop/multiplexer, or
4. demultiplexer/drop/add/multiplexer.

Figure 15B:
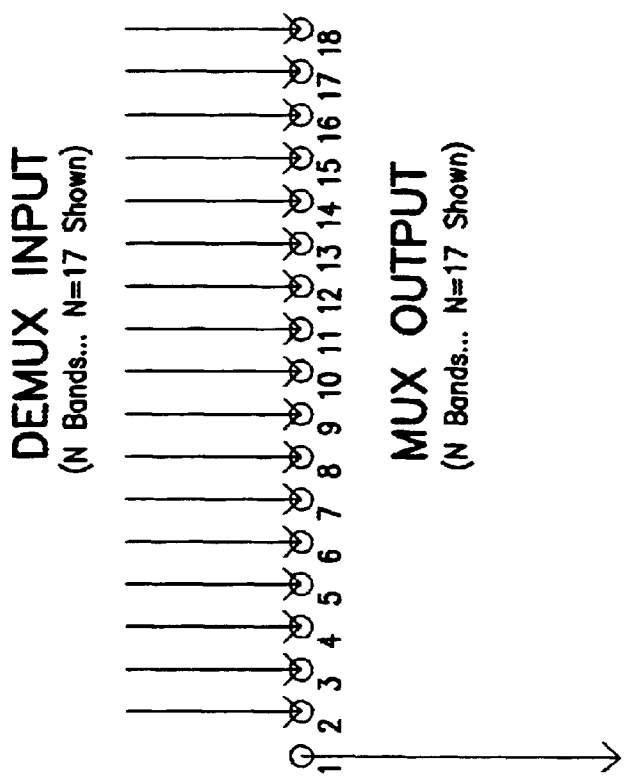
FIGS. 15a–15b are schematic diagrams of operating modes as a demultiplexer (FIG. 15(a)) and as a multiplexer (FIG. 15(b)) of the invention of FIG. 1.
Figure 15A:
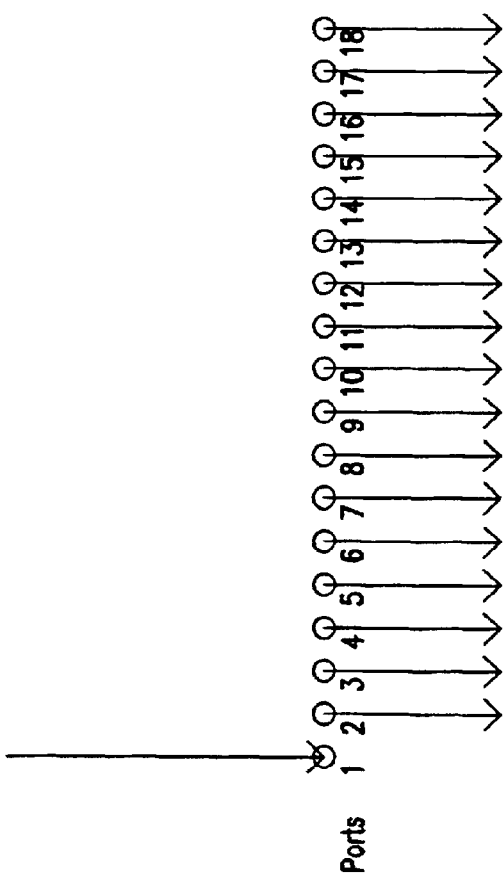
Figure 16:
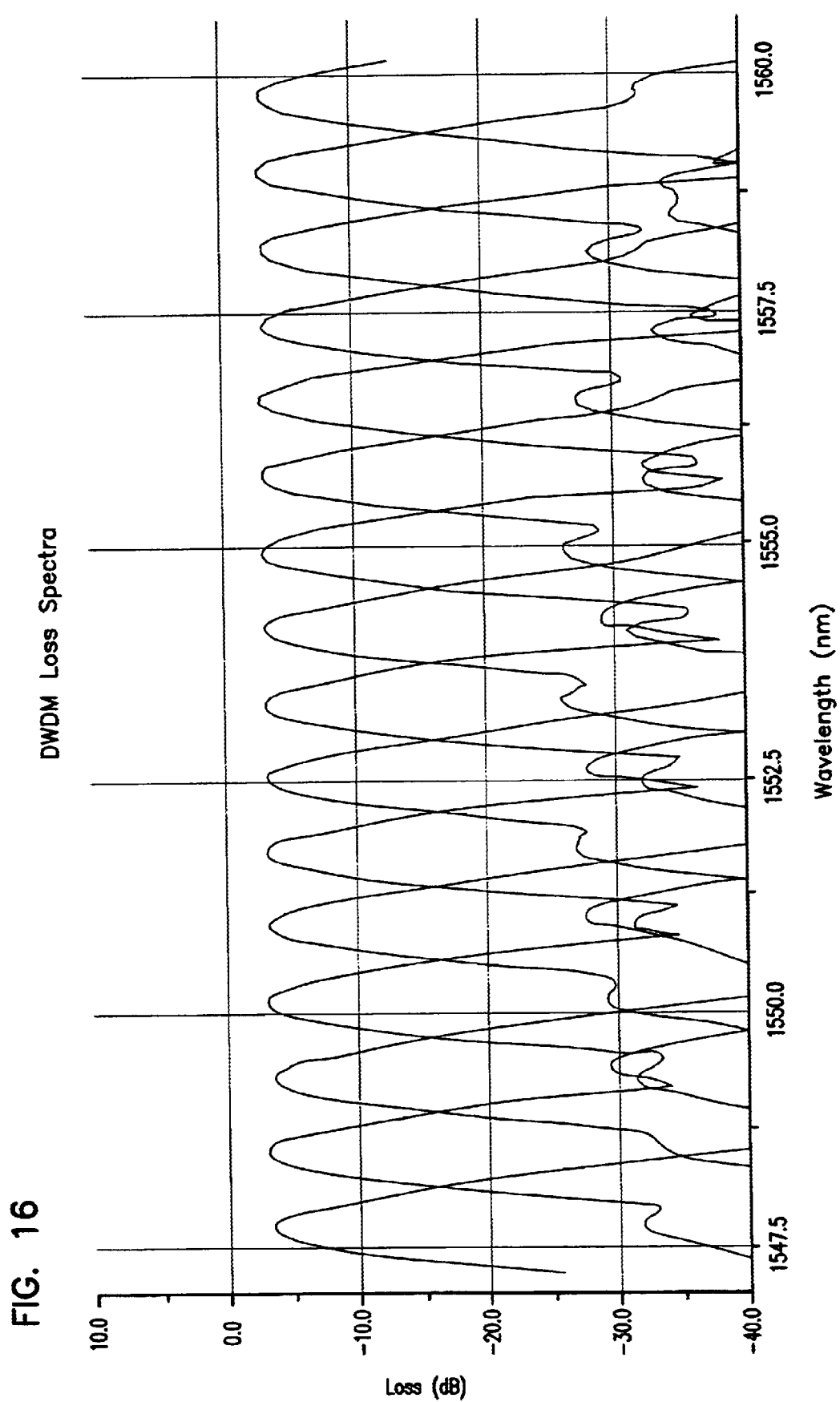
FIG. 16 graphically illustrates the insertion loss of a 16 channel DWDM device constructed by the assignee of the present invention.

The demultiplexing and multiplexing operating modes are described above and are schematically shown in FIGS. 15(a) and 15(b). Such devices are developed by APA Optics, Inc., the assignee of the present invention and others. FIG. 16 shows the measured insertion loss of a 16 channel DWDM which is manufactured by APA Optics, Inc. the assignee of the present invention. When operated in the demultiplexing mode (FIG. 15(a)), input wavelengths at the peaks of the 16 passbands would be demultiplexed and coupled into the appropriate output fiber with less than 3 dB insertion loss. If the direction of propagation is reversed and the device is operated in the multiplexing mode (FIG. 15(b)), then the 16 different wavelengths, each being input on the appropriate input fiber, would be multiplexed and coupled into the single mode output fiber with less than 3 dB insertion loss.

FIGS. 17(a) through 17(d) schematically describe the use of such an example DWDM as an 8 channel OADM. In FIG. 17(a), the fiber carrying the multiplexed wavelengths is coupled to Input Port 1 of the DWDM and a demultiplexed output of N Bands (where N=17 is shown). Similarly, FIG. 17(b) illustrates an example wherein N Bands (where N=17 is shown) of input signals are multiplexed into a single output on Output Port 1 of the DWDM.

In FIG. 17(c) an example of operation in a demultiplexer, drop and multiplexer mode is shown where there are N Bands (N=8 is shown). Here, the eight wavelengths are demultiplexed and each wavelength is coupled into one of the eight output fibers at Ports 11 through 18. Wavelengths coupled into fibers at Ports 12, 14, and 18 are dropped, i.e., extracted for local data transfer or update. The optical fibers at Ports 11, 13, 15, 16, and 17 are connected to fibers at Ports 2, 4, 6, 7, and 8. The wavelengths coupled to Ports 2, 4, 6, 7 and 8 are multiplexed and coupled into the single mode fiber at Output Port 10. Thus, in FIG. 17(c), the input wavelengths are λ1, λ2, λ3, λ4, λ5, λ6, λ7, and λ8; the passthrough wavelengths are λ1, λ3, λ5, λ6, and λ7; and the dropped wavelengths are λ2, λ4, and λ8. The dropped wavelengths are transmitted to local area networks where the encoded data can be simply read, updated, or modified. FIG. 17(d) illustrates operation as a demultiplexer, drop, add, and multiplexer mode. Here, the dropped wavelengths can then be inserted back on the main carrier line by connecting the fibers carrying the dropped wavelengths to the appropriate DWDM Ports (i.e. ports 3, 5, or 9).

Figure 18:
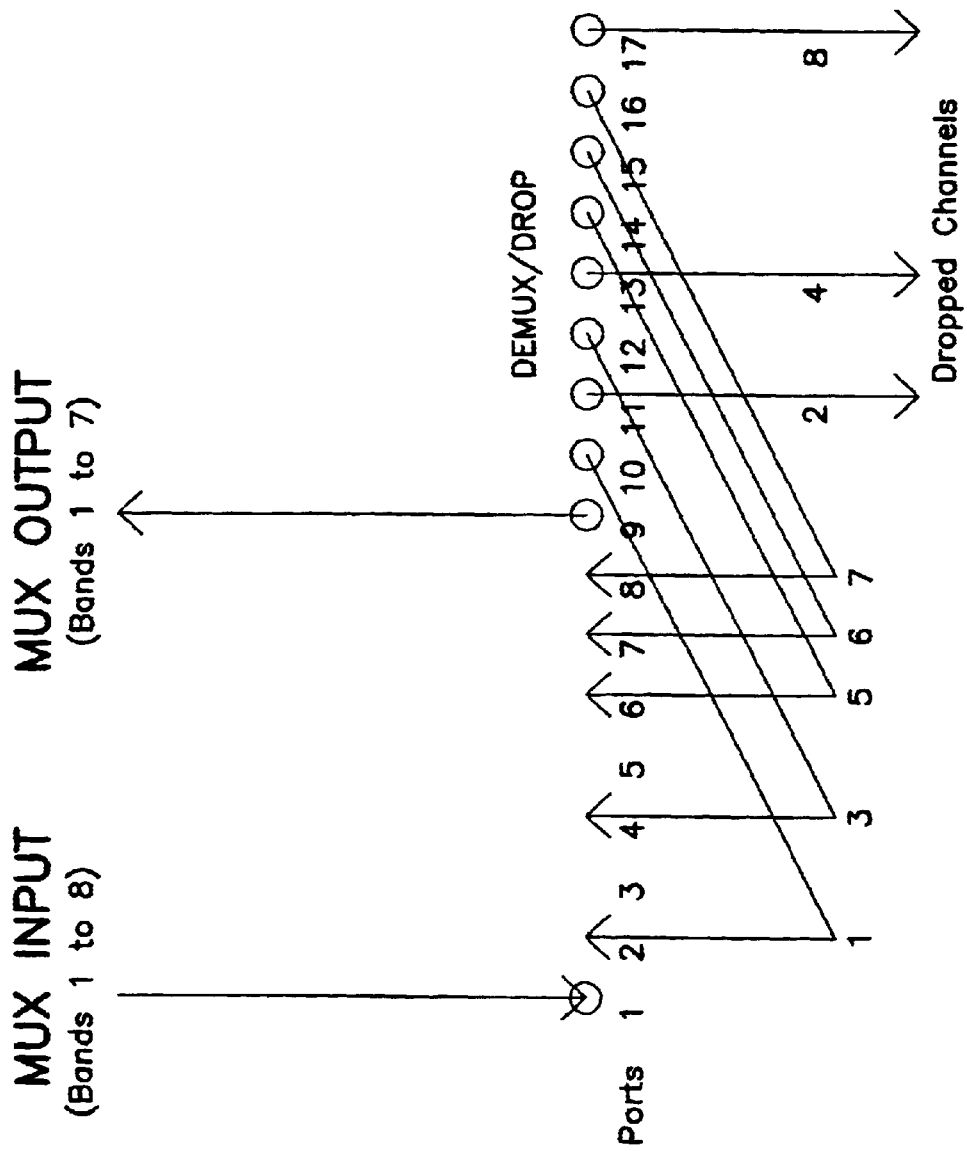
FIG. 18 schematically illustrates an exemplary operating mode of a 16 channel DWDM as a demultiplexer/drop/multiplexer.
Figure 19:
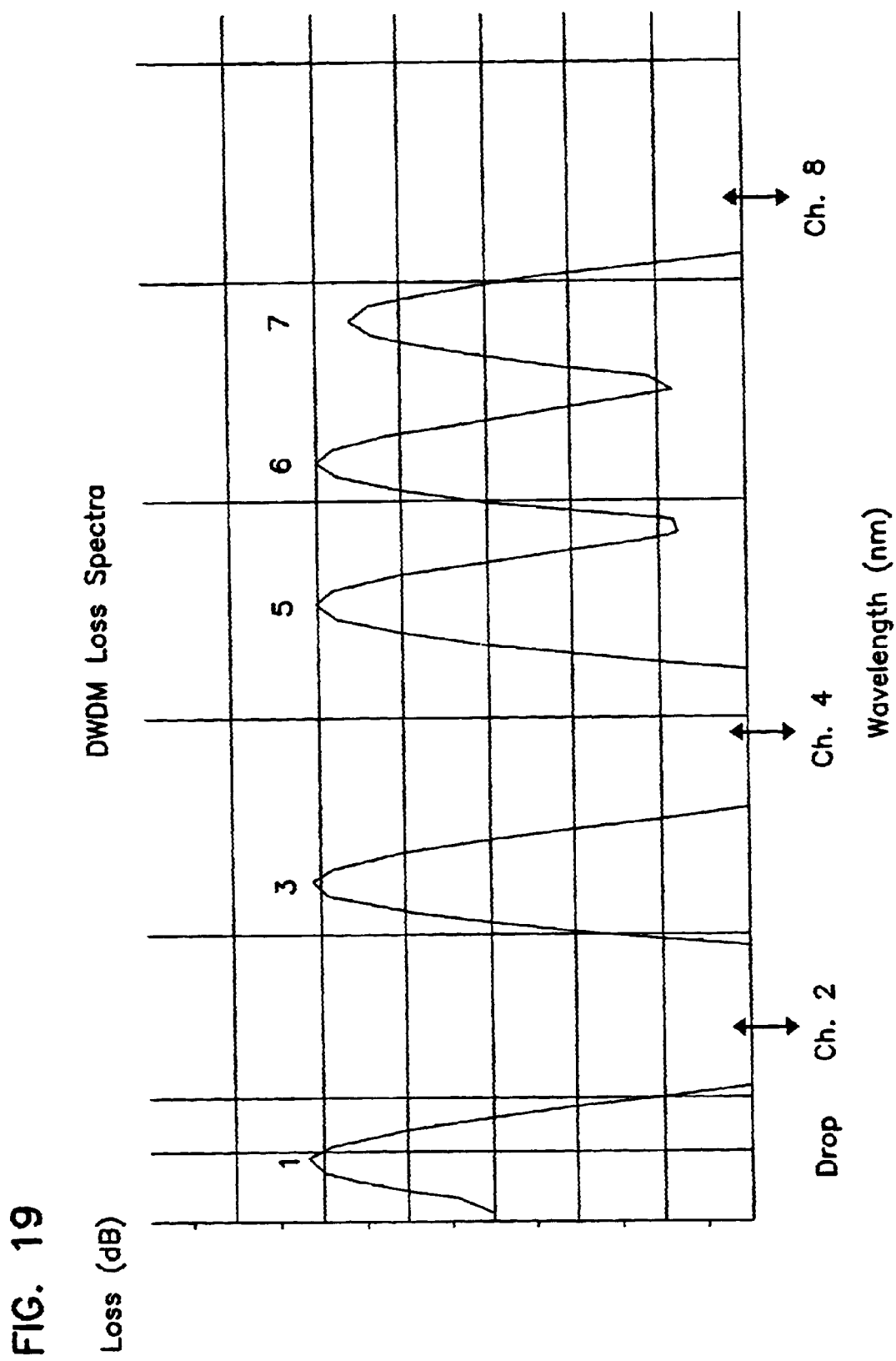
FIG. 19 graphically illustrates the measured output of port 9 of the DWDM of FIG. 18 wherein channels 2, 4, and 8 are dropped.
Figure 20:
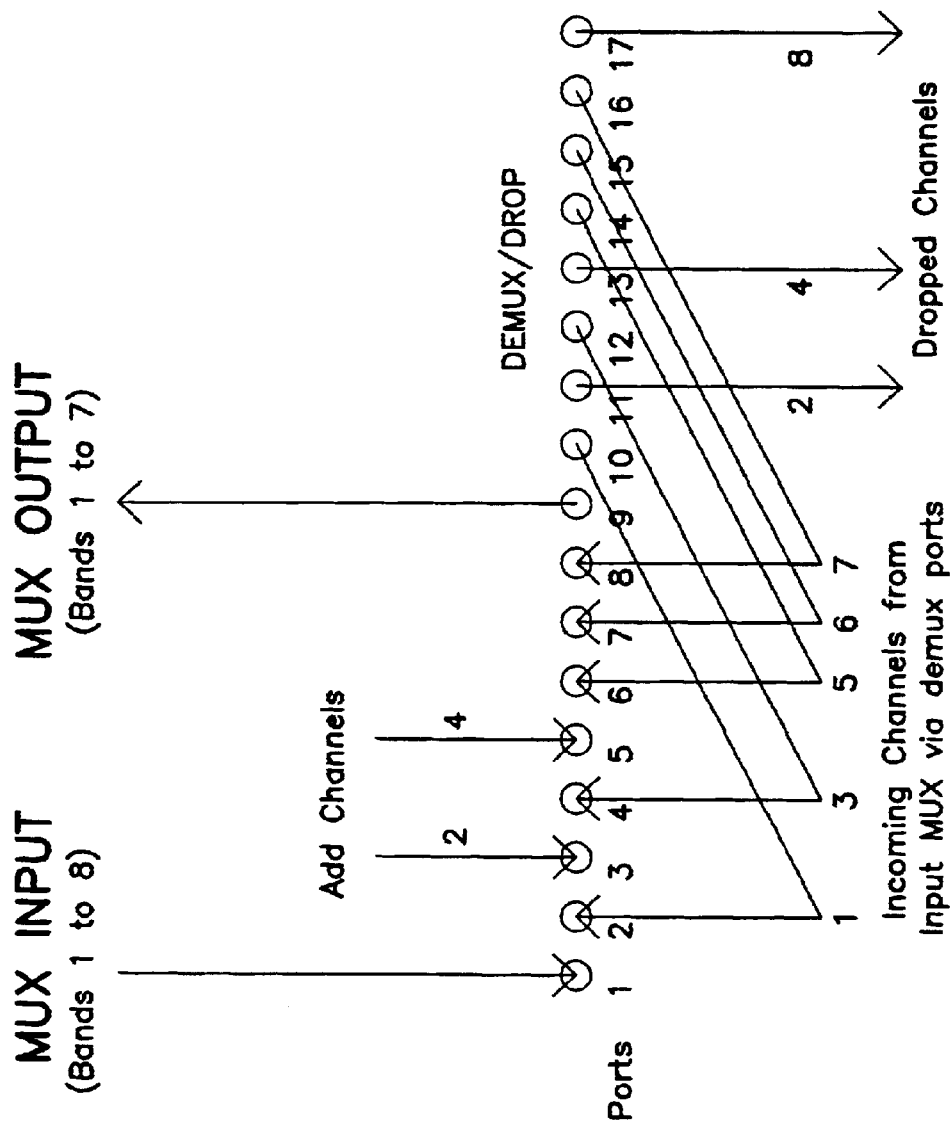
FIG. 20 schematically illustrates an exemplary operating mode of a 16 channel DWDM as a demultiplexer/drop/add/multiplexer.
Figure 21:
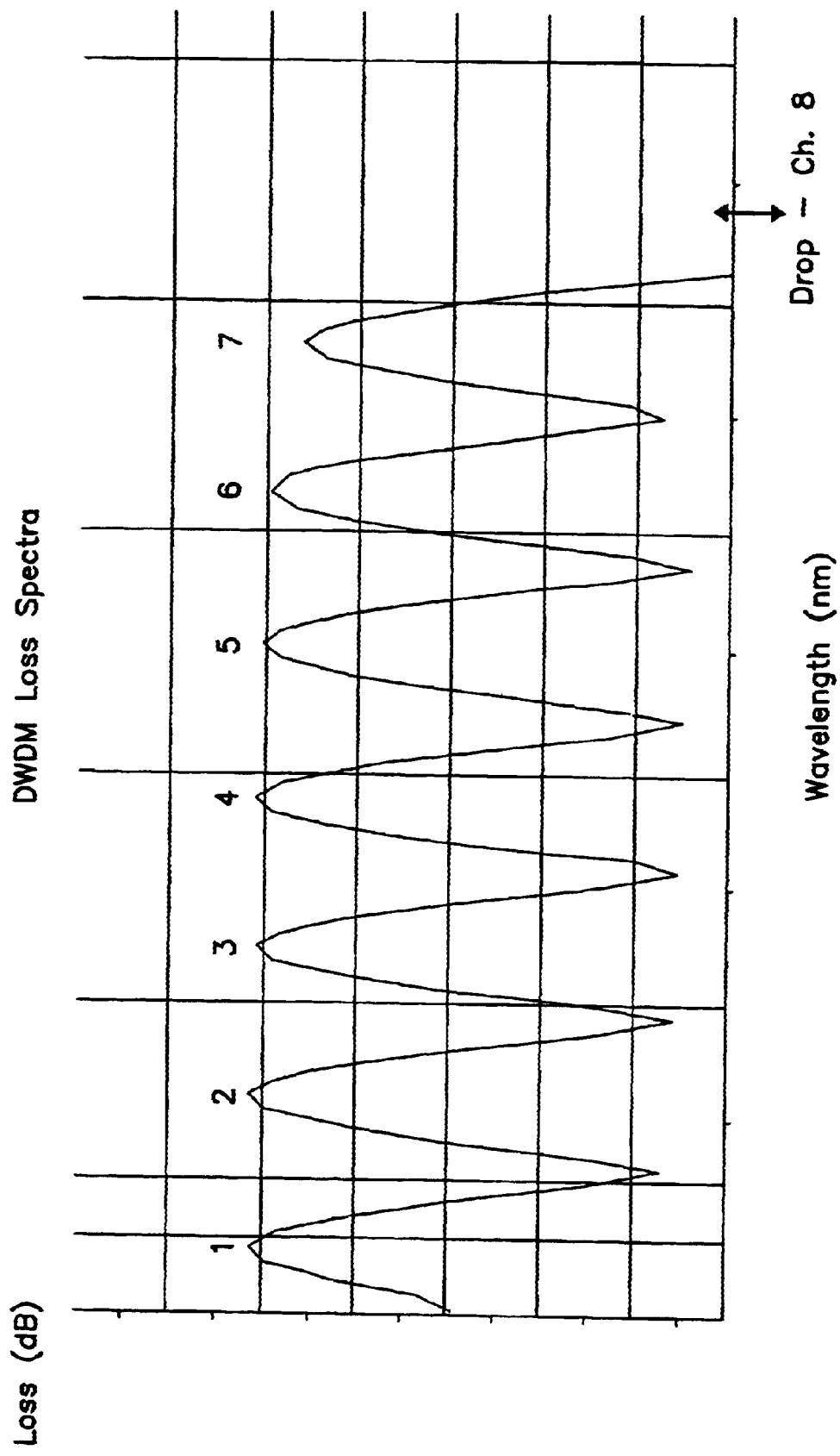
FIG. 21 graphically illustrates the measured output of port 9 of the DWDM of FIG. 20 wherein incoming channels 2, 4, and 8 are dropped and channels 2 and 4 are added to ports 3 and 5.

FIG. 18 again illustrates the demultiplexer/drop/multiplexer operating mode using a 16 channel DWDM. The ports are connected as illustrated with the multiplexer input being bands 1 to 8 and the multiplexer output being bands 1 to 7. The multiplexed signal is coupled into input Port 1. Port 9 is the multiplexed output port. FIG. 19 graphically illustrates the measured output at Port 9 when the wavelength at the input Port 1 is scanned over the wavelength range which includes the design signal wavelengths. As shown in FIG. 19, wavelength channels 2, 4, and 8 are dropped and do not appear at the output Port 9. The wavelengths dropped at Ports 11 and 13 can be added back into the multiplexed output by connecting Ports 3 and 5 to fibers carrying the appropriate wavelength signal, as shown in FIG. 20. FIG. 21 graphically illustrates the resulting signal from the demultiplexer/drop/add/multiplexer operating mode shown in FIG. 20. More specifically, FIG. 21 illustrates the multiplexed output at Port 9 when the wavelengths dropped at Ports 11 and 13 are added back into the DWDM at Ports 3 and 5.

It will be appreciated that the principles of this invention apply not only to the circuitry used to implement the invention, but also to the method in general of automatically utilizing the plurality of wavelengths to transmit information over a single fiber optic device. While a particular embodiment of the invention has been described with respect to its application, it will be understood by those skilled in the art that the invention is not limited by such application or embodiment or the particular components disclosed and described herein. It will be appreciated by those skilled in the art that other components that embody the principles of this invention and other applications therefor other than as described herein can be configured within the spirit and intent of this invention. The arrangement described herein is provided as only one example of an embodiment that incorporates and practices the principles of this invention. Other modifications and alterations are well within the knowledge of those skilled in the art and are to be included within the broad scope of the appended claims.

What is claimed is:

1. An apparatus for switching signals in an optical fiber between add, drop and pass-through status, the apparatus comprising:
   (1) a demultiplexer for demultiplexing the different wavelength signals carried on the optical fiber;
   (2) a first switching array for selecting which demultiplexed signals are routed to a drop port and which demultiplexed signals are to be pass-through signals;
   (3) a second switching array for receiving the pass-through signals and an optional added signal from an add port; and
   (4) a multiplexer for multiplexing the signals from the second switching array and multiplexing the signals into an output port,
   wherein each of the demultiplexer and multiplexer comprises:
      (a) an integrated optical fan-out circuit having a first side and a second side and a plurality of integrated waveguides, each extending between the first and second sides, wherein the waveguides have sufficient separation and are configured and adapted to be coupled to a linear array of optical fibers at the first side, and wherein the separation between the waveguides at the second side is smaller than that at the first side;
      (b) a beam splitter configured and adapted to receive the plurality of light beams and to split each of the beams into a p-polarized beam and s-polarized beam;
      (c) a polarization rotator configured and adapted to rotate the polarization direction of either the p-polarized beams or the s-polarized beams by substantially 90 degrees relative to the other polarized beams;
      (d) a diffraction grating configured and adapted to diffract each of the beams of different wavelength into a different angular direction;
      (e) a polarization rotator configured and adapted to rotate the polarization direction of the p-polarized beams or the s-polarized beams rotated by component (c) by substantially 90 degrees relative to the other polarized beams; and
      (f) a beam combiner configured and adapted to receive the plurality of light beams and to combine the p-polarized beams and s-polarized beams into a single beam having a plurality of wavelengths,
   whereby the device is capable of multiplexing a plurality of light beams of different wavelengths when it is disposed such that the beams propagate sequentially through components (a) through (f), and of demultiplexing a beam containing a plurality of wavelengths when the device is disposed such that the beam propagates sequentially through components (f) through (a).

2. The apparatus of claim 1, wherein the fan-out circuit includes N waveguides configured and adapted to be butt-coupled to a linear array of N optic fibers, wherein the optical components (b) and (c) are the same components (f) and (e), respectively, and are configured and arranged to direct the rotated beams emanating from the grating back sequentially through elements (c), (b) and (a), and the un-rotated beams back sequentially through elements (b) and (a), such that the N−1 light beams through N−1 waveguides in the fan-out circuit can be combined into a single beam containing signals of the plurality of wavelengths, and to launch the combined beam into the remaining waveguide in the fan-out circuit,
   whereby the device is capable of multiplexing N−1 light beams of different wavelengths entering the device through N−1 waveguides in the fan-out circuit into a light beam containing the plurality of wavelengths exiting the remaining waveguide, and of demultiplexing a beam containing a plurality of wavelengths entering the device through one of the waveguides in the fan-out circuit into N−1 light beams of different wavelengths exiting the remaining waveguides.

3. The apparatus of claim 2, wherein the beam tuner comprises a prism.

4. The apparatus of claim 1 wherein the beam splitter includes a glass prism assembly with a multi-layer dielectric polarizing beamsplitter coating.

5. The apparatus of claim 1, wherein the polarization rotator includes a half-wave plate.

6. The apparatus of claim 5, wherein the polarizing beamsplitter and half-wave plate are a monolithic structure comprised of:
   a. a right angle prism;
   b. a beam displacement prism; and
   c. a half-wave plate.

7. The apparatus of claim 1, further comprising a beam tuner configured and adapted to fine time the directions of the beams entering or from the diffraction grating.

8. The apparatus of claim 7, wherein the beam tuner comprises a prism.

9. The apparatus of claim 1, wherein the diffraction grating has a spatial frequency from about 9000 grooves/cm to about 11000 grooves/cm.

10. An optical apparatus for switching signals in an optical fiber between add, drop and pass-through status, the apparatus comprising:

(1) a demultiplexer for demultiplexing the different wavelength signals carried on the optical fiber;

(2) a first switching array for selecting which demultiplexed signals are routed to a drop port and which demultiplexed signals are to be pass-through signals;

(3) a second switching array for receiving the pass-through signals and an optional added signal from an add port; and (4) a multiplexer for multiplexing the signals from the second switching array and multiplexing the signals into an output port, wherein each of the demultiplexer and multiplexer comprises:
- a. means for receiving a light beam, containing optical signals of a plurality of wavelengths;
- b. means for splitting the light beam into a p-polarized and s-polarized beams;
- c. means for rotating the polarization direction of either the p polarized beam or the s polarized beam;
- d. means for diffracting the beams of each of the different wavelength into a different angular direction relative to a defined direction;
- e. means for rotating the polarization direction of either the p polarized beam or the s polarized beam of the diffracted beams;
- f. means for recombining the two optical beams at each wavelength into a single beam having two mutually perpendicular polarization components and propagating in a different angular direction from the recombined beams of other wavelengths;
- g. means for launching the individual signals into separate optical fibers, wherein means (b) and (c) are the same dices, respectively, as means (f) and (e), wherein the elements (b) and (c) are configured and arranged so that the light beams propagating sequentially through means (b) and (c) are diffracted by the diffracting means, and the diffracted beams propagate back sequentially through means (c) and (b).

11. The apparatus of claim 10, further comprising a means for fine tuning the propagation direction of the beam.

12. The apparatus of claim 11, wherein the fine-tuning means comprises a prism.

13. The apparatus of claim 10, wherein the means for diffracting the beam is a diffraction grating.

14. The apparatus of claim 13, wherein the diffraction grating is a holographic grating.

15. The apparatus of claim 10, wherein the means for receiving the focused signals is an optical waveguide.

16. The apparatus of claim 10, wherein the means for splitting the collimated light beam into two beams which are polarized in two mutually perpendicular directions, is a glass prism assembly with a multi-layer dielectric polarizing beamsplitter coating.

17. The apparatus of claim 10, wherein the means for rotating the polarization of the beams is a half-wave plate.

* * * * *

UNITED STATES PATENT AND TRADEMARK OFFICE
CERTIFICATE OF CORRECTION

PATENT NO.    : 6,647,209 B1
DATED         : November 11, 2003
INVENTOR(S)   : Boord et al.

It is certified that error appears in the above-identified patent and that said Letters Patent is hereby corrected as shown below:

Column 3,
Line 62, "beams:which are polarized" should read -- beams which are polarized --

Column 18,
Line 3, "are the same dices," should read -- are the same devices, --

Signed and Sealed this

Thirteenth Day of July, 2004

JON W. DUDAS
*Acting Director of the United States Patent and Trademark Office*